US008844960B2

(12) United States Patent
Young et al.

(10) Patent No.: US 8,844,960 B2
(45) Date of Patent: Sep. 30, 2014

(54) FOLDABLE TRICYCLE

(71) Applicant: Radio Flyer Inc., Chicago, IL (US)

(72) Inventors: Matthew Edward Young, Chicago, IL (US); Randall Alan Sandlin, Chicago, IL (US); Ross Elliot Bartels, Chicago, IL (US); Thomas K. Schlegel, Wheaton, IL (US); Jason Fitzwater, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 14/053,804

(22) Filed: Oct. 15, 2013

(65) Prior Publication Data

US 2014/0103616 A1    Apr. 17, 2014

Related U.S. Application Data

(60) Provisional application No. 61/714,427, filed on Oct. 16, 2012, provisional application No. 61/764,746, filed on Feb. 14, 2013.

(51) Int. Cl.
*B62K 13/04* (2006.01)
*B62K 15/00* (2006.01)

(52) U.S. Cl.
CPC ............. *B62K 15/008* (2013.01); *B62K 15/00* (2013.01)
USPC ........................................................ 280/278

(58) Field of Classification Search
CPC .................................................... B62K 15/008
USPC .......................................... 280/30, 287, 278
See application file for complete search history.

(56) References Cited

U.S. PATENT DOCUMENTS

| 2,194,161 | A | 3/1940 | Cob |
| 2,169,364 | A | 11/1952 | Carson |
| 2,806,709 | A | 9/1957 | Watson |
| 2,914,336 | A | 11/1959 | Hibben, Jr. et al. |
| 3,265,402 | A | 8/1966 | Snyder |

(Continued)

FOREIGN PATENT DOCUMENTS

| EP | 1937541 | 4/2007 |
| JP | 2003320983 | 11/2003 |
| JP | 2004099021 | 4/2004 |
| JP | 2006111222 | 4/2006 |

*Primary Examiner* — Tony Winner
(74) *Attorney, Agent, or Firm* — McDermott Will & Emery LLP

(57) ABSTRACT

A foldable tricycle that transitions between a use orientation, and a transport or storage orientation. The tricycle has a frame including a first end and a second end of the frame, a fork rotatably connected adjacent the first end of the frame, a front wheel rotatably connected to the fork, and a handlebar assembly coupled to the fork to allow for steering of the fork. The tricycle also has first and second rear wheels adjacent the second end of the frame in the use position. The rear wheels are positioned a first distance from a longitudinal axis of the frame in the use position. The first and second wheels can be transitioned to a storage position adjacent the first end of the frame and at a second distance from the longitudinal axis of the frame in the storage position, wherein the first distance from the frame is greater than the second distance from the frame. The tricycle may also have a folding assembly pivotably coupled to the second end of the frame at a first pivot location. As such, the first and second rear wheels may be connected to the folding assembly to simultaneously transition the first and second rear wheels to a storage position with the folding assembly.

21 Claims, 22 Drawing Sheets

(56) References Cited

U.S. PATENT DOCUMENTS

| | | |
|---|---|---|
| 3,905,618 A | 9/1975 | Miranda |
| 4,142,736 A | 3/1979 | Ackerfeldt et al. |
| 4,457,529 A | 7/1984 | Shamie et al. |
| 4,474,388 A | 10/1984 | Wagner |
| 5,074,577 A | 12/1991 | Kim |
| 5,087,040 A | 2/1992 | Wu |
| RE33,939 E | 5/1992 | Cheng |
| 5,201,540 A | 4/1993 | Wu |
| 5,409,253 A | 4/1995 | Cheng |
| 5,586,778 A | 12/1996 | Lindh et al. |
| 5,590,896 A | 1/1997 | Eichhorn |
| 5,660,435 A | 8/1997 | Eichhorn |
| 5,667,239 A | 9/1997 | Yang |
| 5,765,857 A | 6/1998 | Hsiao |
| 5,829,585 A | 11/1998 | Kao et al. |
| 5,887,889 A | 3/1999 | Andrus |
| 6,007,031 A | 12/1999 | Tang |
| 6,079,718 A | 6/2000 | Liao |
| 6,102,431 A | 8/2000 | Sutherland et al. |
| 6,105,998 A | 8/2000 | Baechler et al. |
| 6,152,473 A | 11/2000 | Shih |
| 6,152,476 A | 11/2000 | Huang |
| 6,155,579 A | 12/2000 | Eyman et al. |
| 6,299,194 B1 | 10/2001 | Chen |
| 6,533,311 B2 | 3/2003 | Kaneko et al. |
| 6,575,486 B2 | 6/2003 | Ma |
| 6,609,723 B2 | 8/2003 | Chuang |
| 6,682,090 B2 | 1/2004 | Chen |
| 6,719,319 B2 | 4/2004 | Liao |
| 6,722,690 B2 | 4/2004 | Lan |
| 6,739,616 B2 | 5/2004 | Lin |
| 6,767,028 B2 | 7/2004 | Britton et al. |
| 6,789,808 B2 | 9/2004 | Yang |
| 6,869,096 B2 | 3/2005 | Allen et al. |
| 6,874,802 B2 | 4/2005 | Gunter et al. |
| 6,935,649 B2 | 8/2005 | Lim |
| 6,966,572 B2 | 11/2005 | Michelau et al. |
| 7,000,928 B2 | 2/2006 | Liao |
| 7,000,935 B2 | 2/2006 | Gunter et al. |
| 7,000,939 B2 | 2/2006 | Shapiro |
| 7,077,420 B1 | 7/2006 | Santoski |
| 7,128,333 B2 | 10/2006 | Reimers et al. |
| 7,137,644 B2 | 11/2006 | Kimberley |
| 7,219,920 B2 | 5/2007 | Lin |
| 7,281,725 B1 | 10/2007 | Gunter et al. |
| 7,296,819 B2 | 11/2007 | Cunningham |
| 7,300,066 B2 | 11/2007 | Kettler et al. |
| 7,347,443 B2 | 3/2008 | Barton |
| 7,390,012 B2 | 6/2008 | Church |
| 7,396,039 B2 | 7/2008 | Valdez et al. |
| 7,422,230 B2 | 9/2008 | Chuan |
| 7,591,479 B2 | 9/2009 | Golias |
| 7,632,035 B2 | 12/2009 | Cheng |
| 7,658,252 B2 | 2/2010 | Shapiro |
| 7,694,980 B2 | 4/2010 | Dotsey et al. |
| 7,766,359 B2 | 8/2010 | Klevana et al. |
| 7,798,515 B2 | 9/2010 | Valdez et al. |
| 7,871,099 B2 | 1/2011 | Gilbertson et al. |
| 7,909,353 B2 | 3/2011 | Nolan et al. |
| 7,934,729 B2 | 5/2011 | Murphy et al. |
| 8,061,732 B2 | 11/2011 | Song et al. |
| 8,104,777 B2 | 1/2012 | Liao |
| 8,191,920 B2 | 6/2012 | Zhang |
| 8,226,111 B2 | 7/2012 | Valdez et al. |
| 2002/0093177 A1 | 7/2002 | Chen |
| 2003/0141695 A1 | 7/2003 | Chen |
| 2003/0201621 A1 | 10/2003 | Jang |
| 2005/0035646 A1 | 2/2005 | Everett |
| 2008/0277901 A1 | 11/2008 | Catelli |
| 2009/0115151 A1 | 5/2009 | Van Dijk |
| 2010/0308550 A1 | 12/2010 | Li et al. |
| 2010/0308561 A1 | 12/2010 | Diekman et al. |
| 2010/0314855 A1 | 12/2010 | Mival et al. |
| 2011/0012325 A1 | 1/2011 | Gower et al. |
| 2011/0074125 A1 | 3/2011 | Aiken et al. |
| 2012/0104712 A1 | 5/2012 | Kobayashi |

FOLDABLE TRICYCLE

CROSS-REFERENCE TO RELATED APPLICATIONS

This application claims priority to U.S. Provisional Patent Application No. 61/714,427, filed Oct. 16, 2012, and U.S. Provisional Patent Application No. 61/764,746, filed Feb. 14, 2013, both of which are incorporated herein by reference in their entirety and made a part hereof.

FEDERALLY SPONSORED RESEARCH OR DEVELOPMENT

Not Applicable.

TECHNICAL FIELD

The present disclosure generally relates to a foldable tricycle. In particular, a foldable tricycle is provided with rear wheels that fold forwardly and inwardly. The tricycle can also include removable accessories that allow the tricycle to function as a stroller, as well as a parent steering system.

BACKGROUND

Tricycles that include an upwardly extending rear handle to allow a parent to steer the tricycle are known. Some tricycles include features such as a footrest for the child to use while the parent is pushing the tricycle. Other tricycles include a substantially rigid restraining hoop that extends around the child, and a safety harness that secures the child to the seat. Some tricycles also include a canopy for protecting the child from the sun. The large number of accessories available on these and other known tricycles can make storing and transporting the tricycle difficult because they tend to enlarge the overall volumetric envelope or footprint the tricycle occupies. The present invention seeks to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY

According to one embodiment, the disclosed subject technology relates to a tricycle that converts from a use position to a transport or storage position. In one embodiment the tricycle has a frame having a first end and a second end, a rotatable fork adjacent the first end of the frame, a front wheel rotatably connected to the fork, a handlebar assembly coupled to the fork to allow for steering of the fork, and first and second rear wheels located adjacent the second end of the frame in the use position, the first and second rear wheels further being positioned a first distance from a longitudinal axis of the frame in the use position.

In another embodiment the disclosed subject technology further relates to a folding assembly pivotably coupled to the second end of the frame at a first pivot location defining a first pivot axis. The first and second rear wheels are coupled to the folding assembly. The folding assembly has an actuator to allow pivoting of the folding assembly to simultaneously transition the first and second rear wheels to a storage position. The first and second wheels are positioned adjacent the first end of the frame and at a second distance from the longitudinal axis of the frame in the storage position, the first distance being greater than the second distance. In one embodiment the first pivot axis is substantially perpendicular to a longitudinal extent of the frame.

In another embodiment the disclosed subject technology further relates to a first leg having a distal end and a proximal end, the proximal end pivotally coupled to the frame at a second pivot location. The second pivot location defines a second pivot axis that is angled with respect to the first pivot axis. The first rear wheel is pivotally coupled to the distal end of the first leg.

In another embodiment the disclosed subject technology further relates to a second leg having a distal end and a proximal end pivotally coupled to the frame at a third pivot location. The third pivot location defines a third pivot axis that is angled with respect to the first pivot axis. The second rear wheel is pivotally coupled to the distal end of the second leg.

In another embodiment the disclosed subject technology further relates to a first link having a first end pivotally coupled to the folding assembly and a second end pivotally coupled to the first leg at a location between the distal end and the proximal end. Additionally, a second link having a first end is pivotally coupled to the folding assembly and a second end pivotally coupled to the second leg at a location between the distal end and the proximal end.

In another embodiment the disclosed subject technology further relates to a push handle removably coupled to the tricycle and extending upwardly and away from the rear wheels a distance greater than a height of the seat in the use position. The push handle is transitionable from the use position to the storage position and remains coupled to the tricycle in the storage position. In one embodiment, the push handle is coupled to the folding assembly that is pivotally coupled to the second end of the frame at a first pivot axis. In another embodiment, the push handle is removable from the folding assembly, and the folding assembly can be actuated to pivot the folding assembly and the rear wheels from the use position to the storage position when the steer handle is removed from the tricycle. According to another embodiment, the push handle comprises an upper shaft and a lower shaft, the upper shaft being moveable between an extended position and a retracted position to decrease a length of the push handle.

In another embodiment the disclosed subject technology further relates to a steer handle removably connected to the folding assembly. In one embodiment the tricycle operates in a stroller mode when the steer handle is connected to the folding assembly.

In another embodiment the disclosed subject technology further relates to a transmission assembly coupling the steer handle and the fork. Rotation of the steer handle causes rotation of the fork to steer the tricycle.

In another embodiment the disclosed subject technology further relates to a seat coupled to the tricycle. In one embodiment the location of the seat is adjustable about a length of the frame. In another embodiment the seat comprises a seat portion coupled to the frame and a back portion coupled to the folding assembly. The back portion transitions from the use position to the storage position with the folding assembly.

In another embodiment the disclosed subject technology further relates to a removable footrest coupled to the frame. The footrest is positionable in a footrest use position and a footrest storage position when coupled to the frame. Pivoting of the folding assembly and first and second rear wheels causes the footrest to be positioned in the footrest storage position.

In yet another embodiment the disclosed subject technology further relates to a frame that comprises a forward portion at the first end and a rearward portion at the second end. The forward and rearward portions of the frame members have a telescoping relationship to increase and decrease a length of the frame.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

Figure 1:
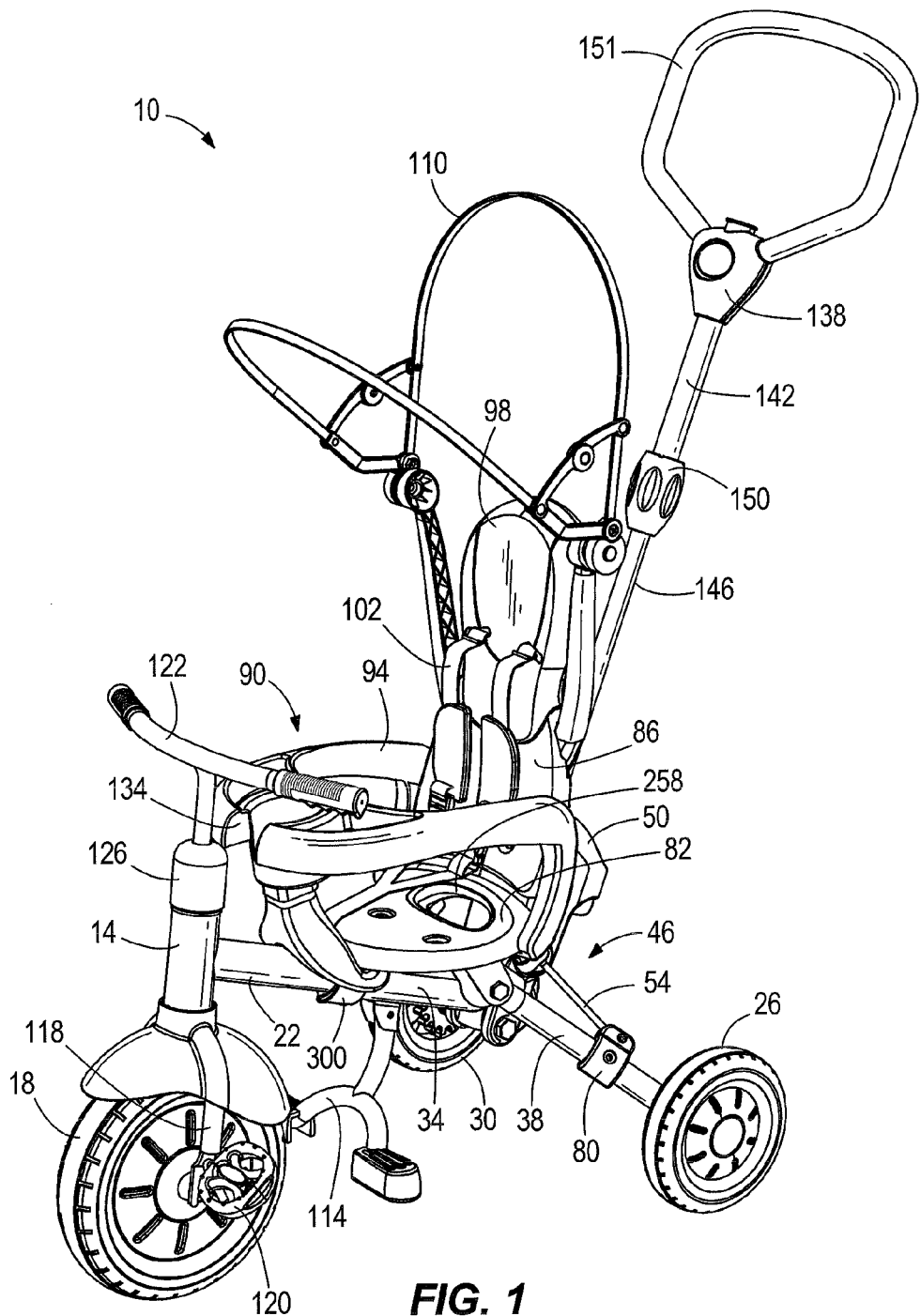
FIG. 1 is a perspective view of a foldable tricycle according to one embodiment, illustrated in an unfolded configuration and with stroller accessories.
Figure 2:
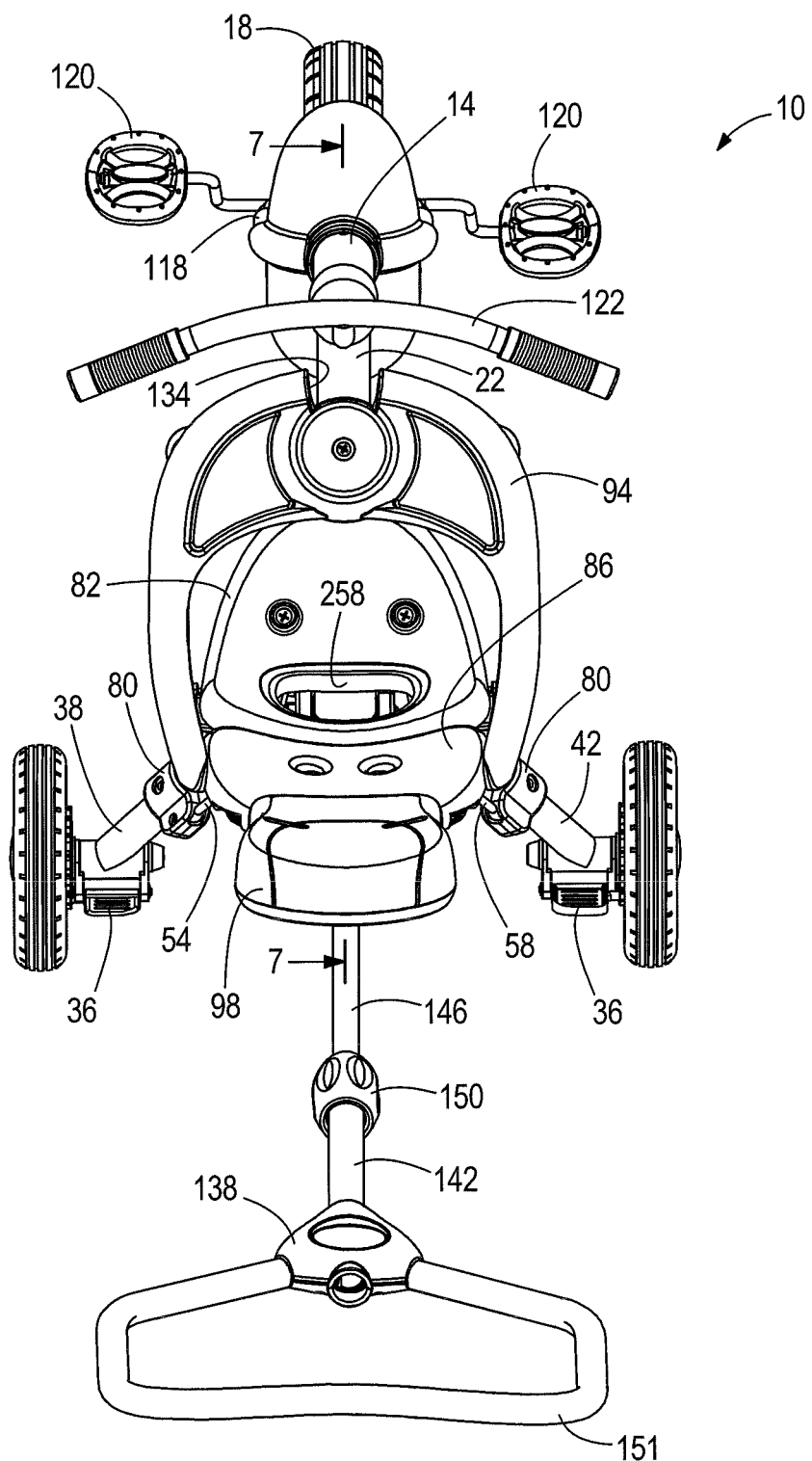
FIG. 2 is top view of the foldable tricycle of FIG. 1.

While the foldable tricycle discussed herein is susceptible of embodiments in many different forms, there is shown in the drawings, and will herein be described in detail, preferred embodiments with the understanding that the present description is to be considered as an exemplification of the principles of the foldable tricycle and are not intended to limit the broad aspects of the disclosure to the embodiments illustrated.

The foldable tricycle is a product that can be used by children from the infant stage through the toddler stage and into the adolescent stage and beyond. For example, the foldable tricycle can operate as a traditional stroller with a safety harness (i.e., a five point seat belt), an infant stroller support hoop, a sun canopy and a handle for the parent to push and steer the stroller. Further, as the child grows the safety harness, infant support hoop and sun canopy can be removed, independently as desired by the user, such that the tricycle operates as an infant push tricycle. In the push tricycle stage the foldable tricycle can be used as a traditional tricycle by the child, but it also has foot supports if the child gets tired of pedaling, whereby the child can rest his or her feet on the foot supports and the parent can use the parent push or steer handle to push and/or steer the tricycle. Finally, when the child no longer needs the parent steer handle and/or the foot supports, they can likewise be independently removed for use as a traditional tricycle. Moreover, in each of these configurations the tricycle is fully foldable for transportation/storage without removing any peripheral. As such, the tricycle converts from a use position to a transport or storage position.

Referring now to the figures, and initially to FIGS. 1-4, in one embodiment the foldable tricycle 10 includes a frame 14, a front wheel 18 supporting a forward or first portion or end 22 of the frame 14, and first and second rear wheels 26, 30 supporting a rearward or second portion or end 34 of the frame 14. In one embodiment the frame 14 is a unitary member with the forward or first portion 22 being at one end thereof and the rearward or second portion 34 being at the opposing end thereof. In an alternate embodiment the forward portion 22 and rearward portion 34 are separate components that are coupled together. In such an embodiment the forward portion 22 and the rearward portion 34 of the frame 14 may be slidably coupled to one another for adjusting a length of the foldable tricycle 10, as discussed further below.

Figure 3:
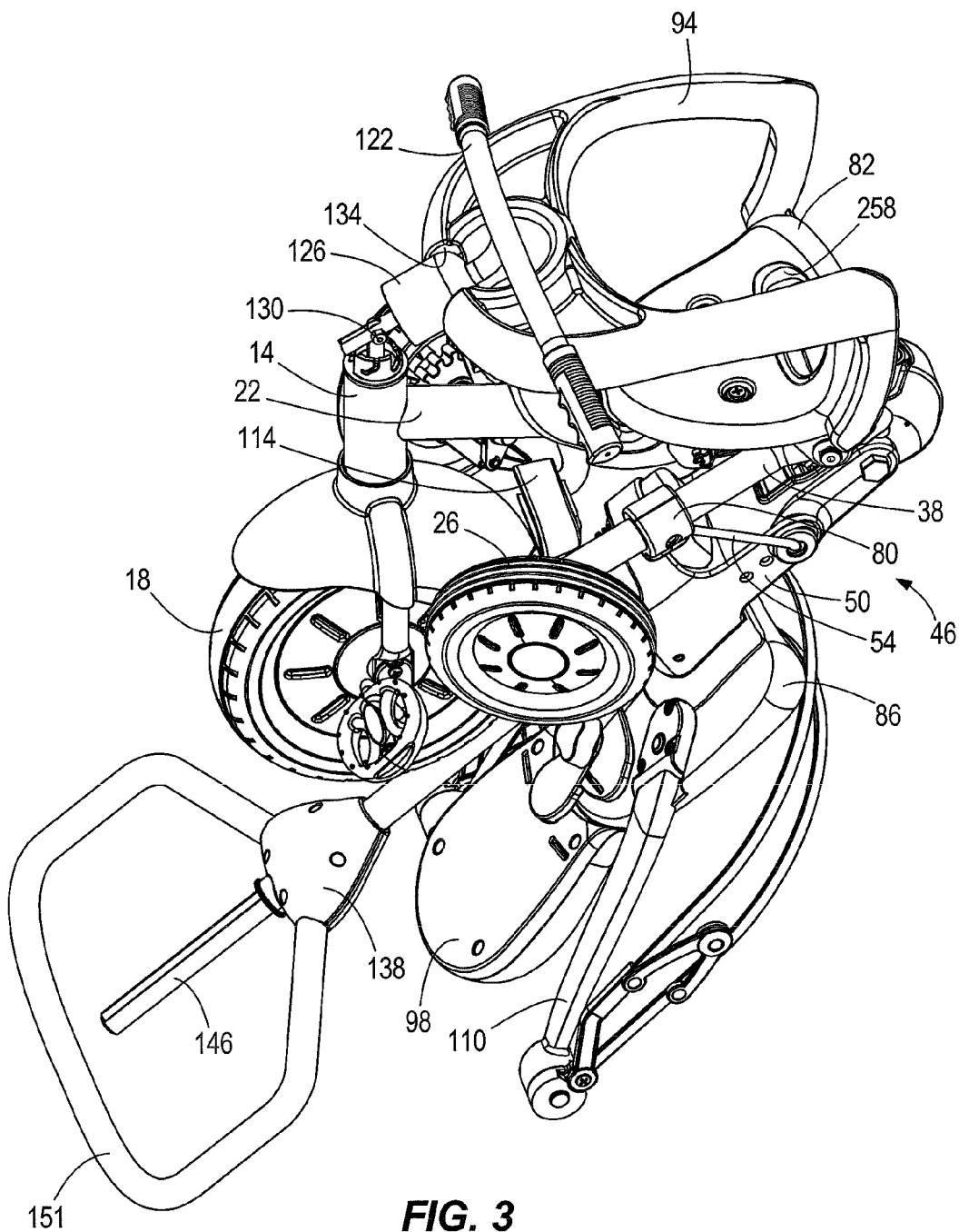
FIG. 3 is a perspective view of the foldable tricycle of FIG. 1 in a folded configuration.
Figure 4:
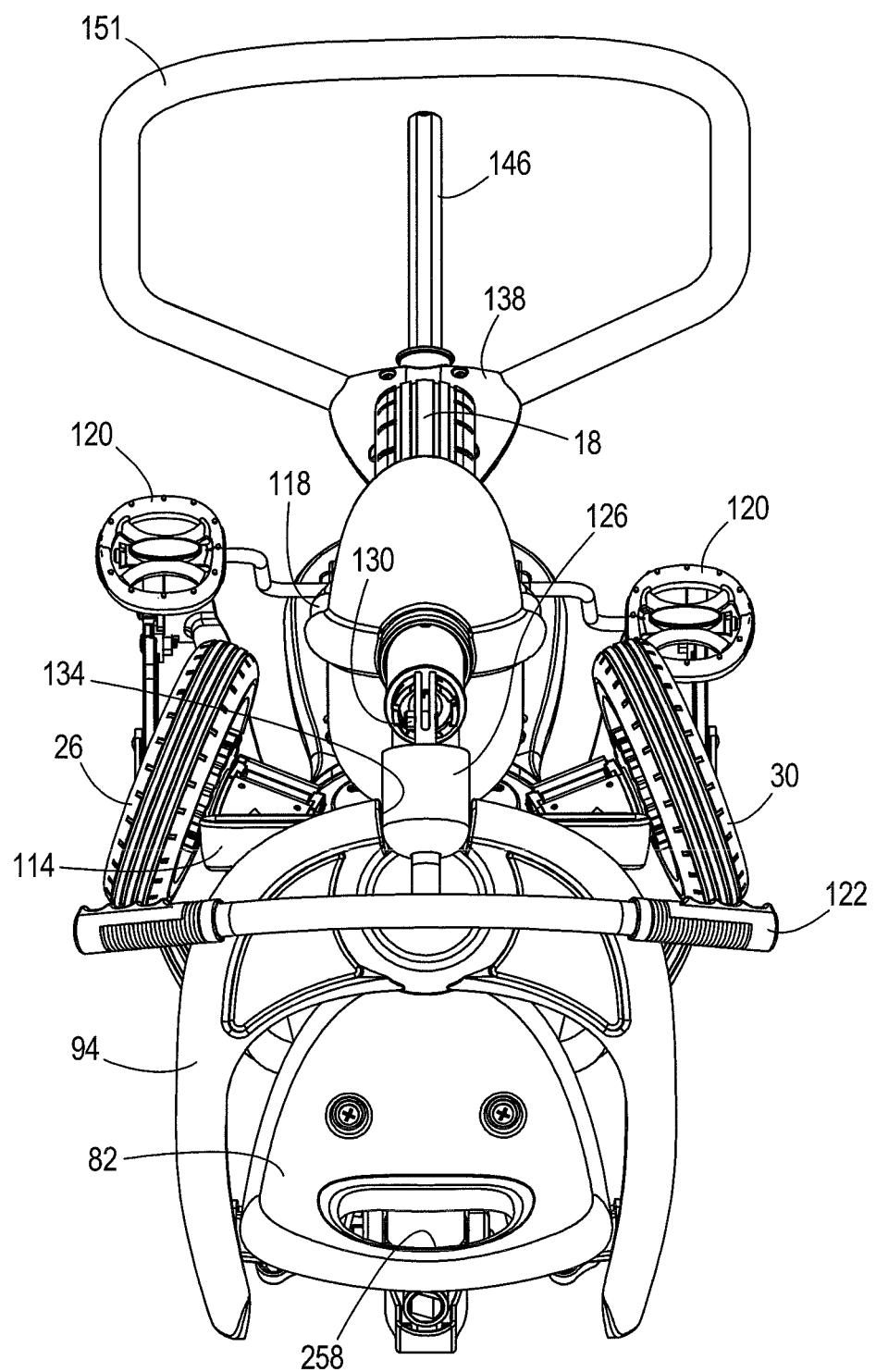
FIG. 4 is a top view of the foldable tricycle of FIG. 1 in the folded configuration.

The first and second rear wheels 26, 30 are located adjacent the second end 34 of the frame 14 in the use position. Further, the first and second rear wheels 26, 30 are further positioned a first distance from a longitudinal axis of the frame 14 in the use position. In a preferred embodiment, the first rear wheel 26 is rotatably supported at a distal end of a first leg 38, and the second rear wheel 30 is rotatably supported at a distal end of a second leg 42. A brake assembly 36 may be provided on one or both of the first and second rear wheels 26, 30. The brake assemblies 36 are typically used in the stroller configuration, however, they may be used in the tricycle configuration as well. A folding mechanism 46 including a folding or rotating/pivot assembly 50 is situated at the rear of the foldable tricycle 10 and is configured to permit both the first leg 38 and the second leg 42 to be folded generally forwardly and inwardly for storage and transportation of the tricycle 10, as shown in FIGS. 3 and 4. The first and second rear wheels 26, 30 are coupled to the folding assembly 50. In a preferred embodiment the first and second wheels 26, 30 are positioned a first distance from a longitudinal axis of the frame 14 in the use position, and a second distance from the longitudinal axis of the frame 14 in the storage position, where the first distance is greater than the second distance. Accordingly, to transition from the use position to the storage position the rear wheels 26, 30 are moved forwardly and inwardly.

Figure 5:
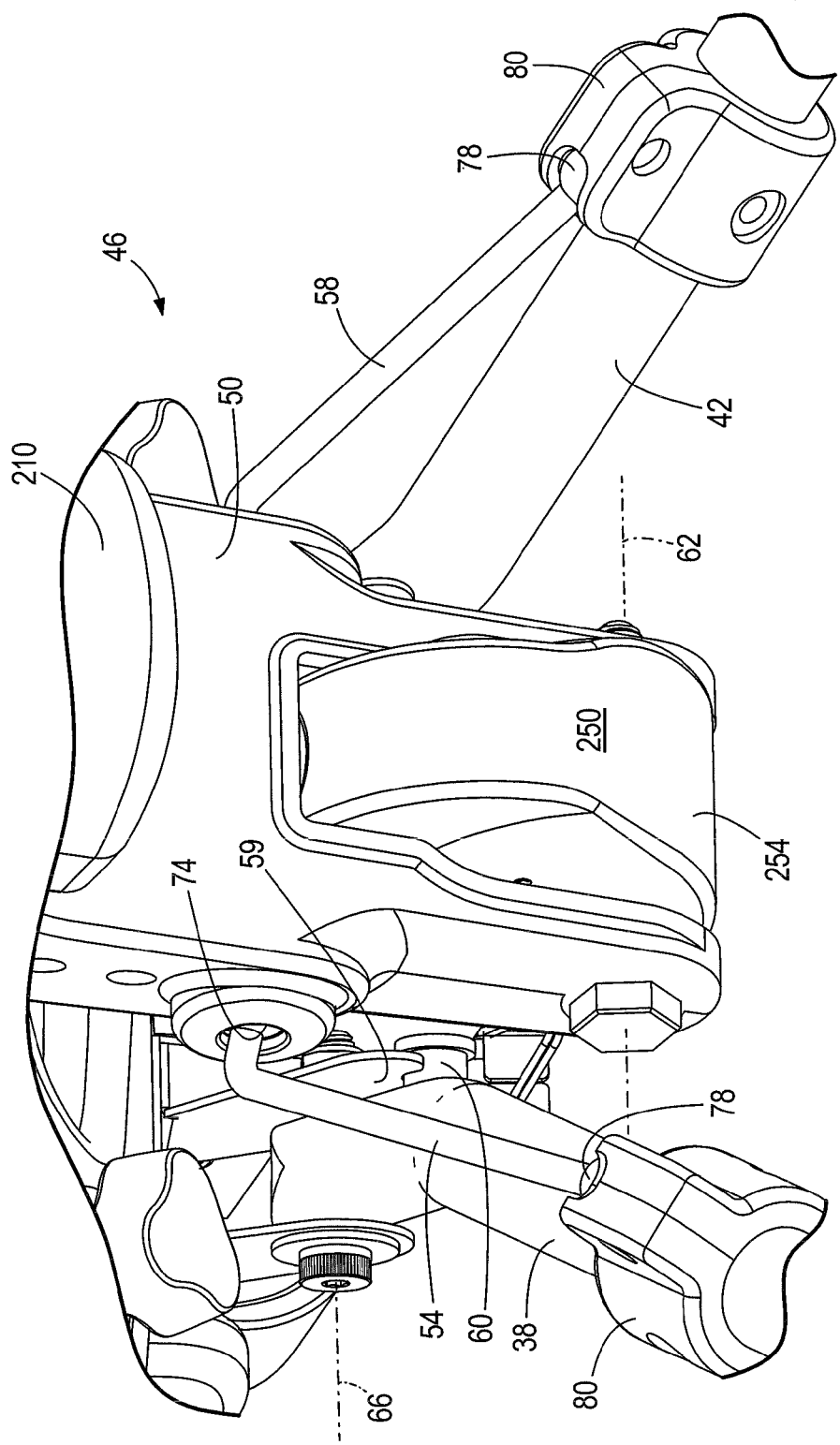
FIG. 5 is an enlarged partial rear perspective view showing various rear linkages of the foldable tricycle of FIG. 1.

As best shown in the illustrated embodiment of FIG. 5, in one embodiment the folding mechanism 46 preferably comprises a four-bar linkage arrangement, although other configurations are possible, which operates to fold the rear wheels, parent push/steer handle and pivot assembly 50 for storage and transportation. In one embodiment the folding mechanism 46 includes (i) the rearward portion 34 of the frame 14, (ii) the first and second legs 38, 42, which as noted above are pivotally coupled to the rearward portion 34, (iii) a pivot or folding assembly 50 pivotally coupled to the rearward portion 34 of the frame 14, and (iv) first and second links 54, 58 pivotally coupled to and extending between the pivot assembly 50 and a respective one of the first and second legs 38, 42. The folding mechanism 46 is set into movement through operation of the folding or pivot assembly 50. A stop bracket 59 provided on the rearward portion 34 at least partially supports the tricycle 10 in the unfolded configuration through engagement with a stop boss 60 provided on the first leg 38. A similar stop bracket and boss may also or alternatively be provided on the second leg 42.

Figure 6:
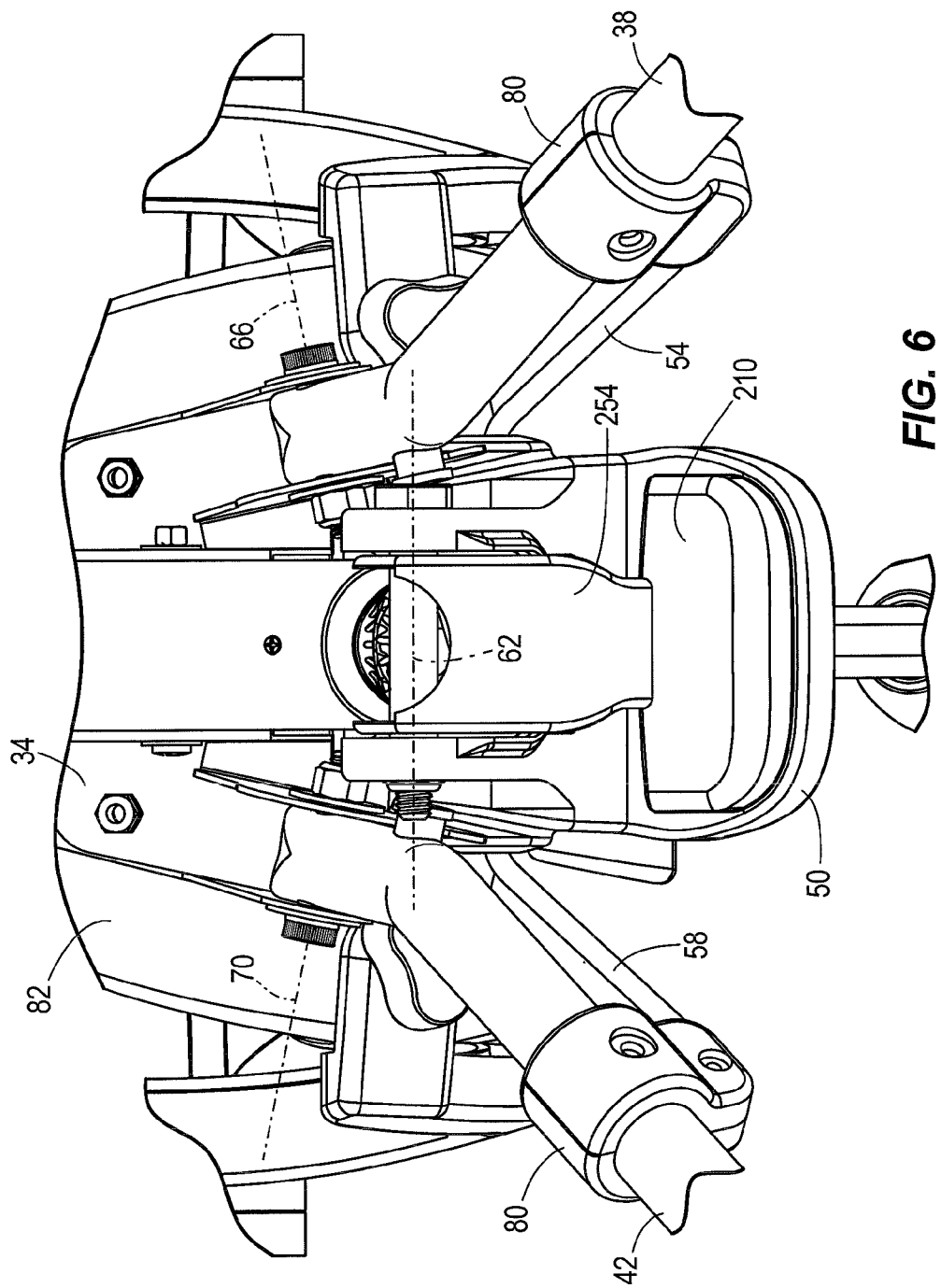
FIG. 6 is an enlarged partial bottom view of the foldable tricycle of FIG. 1 in the unfolded configuration.
Figure 9:
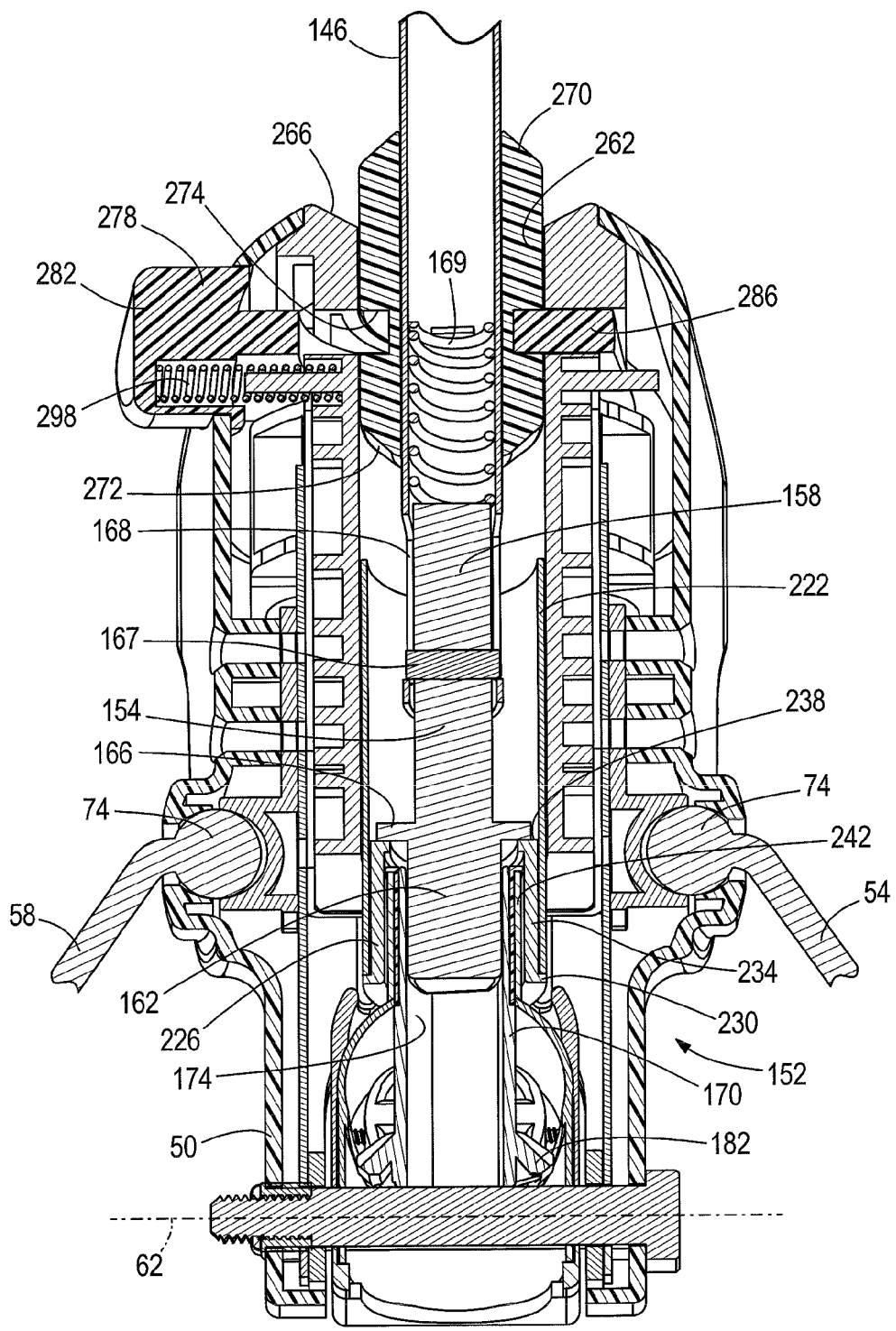
FIG. 9 is a section view taken along a portion of line 9-9 of FIG. 7.

Referring also to FIG. 6, in one embodiment the folding or pivot assembly 50 is pivotally coupled adjacent the rearward portion or second end 34 of the frame 14 for pivotal movement about a first pivot axis 62. The first pivot axis 62 is substantially perpendicular to the longitudinal extent of the frame 14. By setting into action and pivoting the pivot assembly 50, folding action of the tricycle 10 occurs. To allow for folding, the first leg 38 is pivotally coupled to the rearward portion 34 of the frame 14 for pivotal movement about a second pivot axis 66 that, as shown in FIG. 6, is angled with respect to the first axis 62, and the second leg 42 is similarly pivotally coupled to the rearward portion 34 of the frame 14 for pivotal movement about a third pivot axis 70 that also is angled with respect to the first axis 62. Each of the first and second links 54, 58 includes a first end 74 coupled to the pivot assembly 50 and a second end 78 coupled to a collar 80 that is fixed generally along an intermediate portion of a respective one of the first and second legs 38, 42. As best shown in FIGS. 5 and 9, the coupling arrangements between the pivot assembly 50 and the first ends 74 of the first and second links 54, 58, and between the collar 80 and the second ends 78 of the first and second links 54, 58, provide sufficient freedom of motion to permit the legs to fold both forwardly and inwardly as the folding mechanism 46 is operated to fold the tricycle 10. In one embodiment, the coupling arrangement is a ball and socket type configuration, as shown in FIG. 9, however other types of coupling arrangements are suitable for this purpose.

Figure 7:
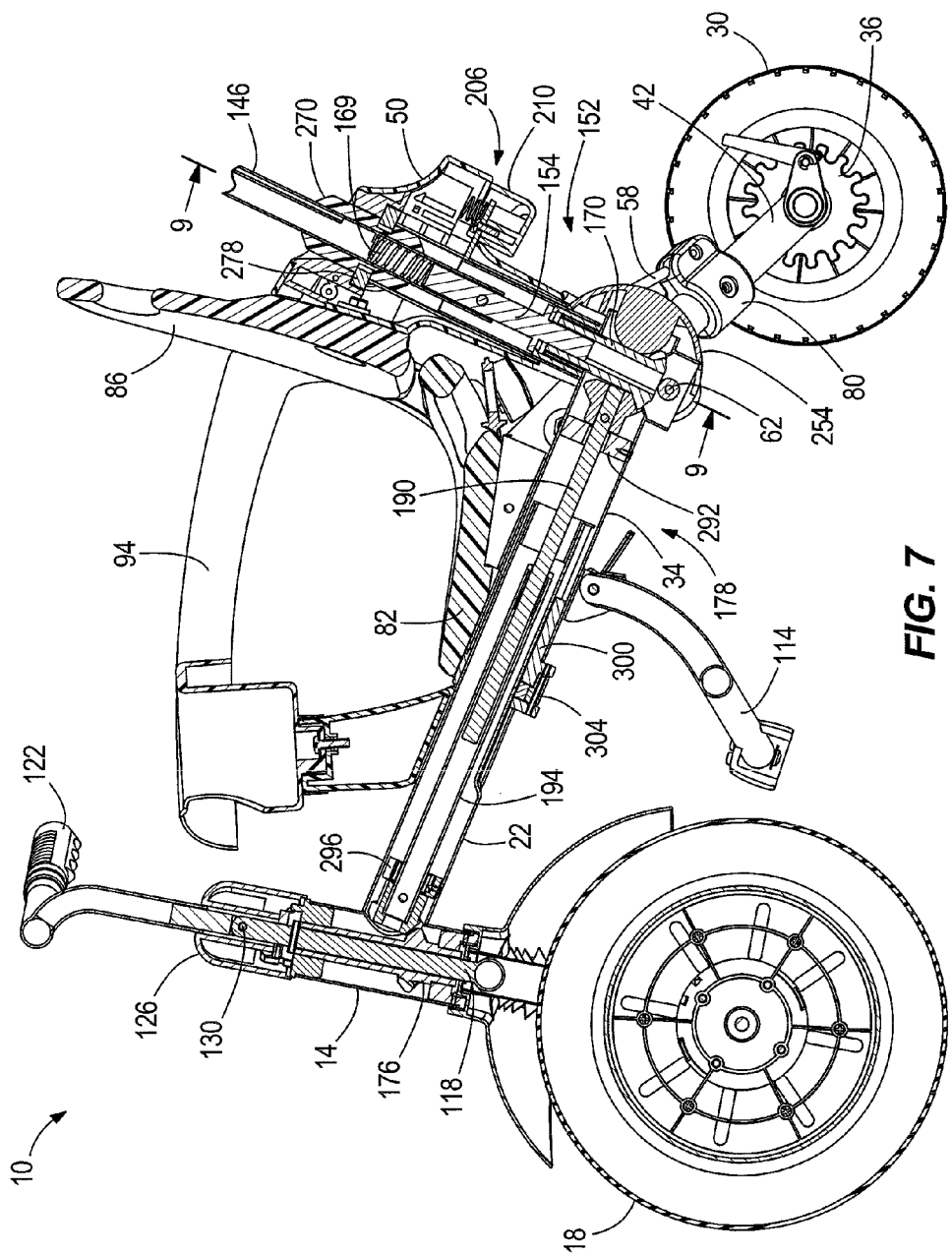
FIG. 7 is a section view taken along line 7-7 of FIG. 2.

As shown in FIG. 7, a seat base 82 is coupled to the rearward portion 34 of the frame 14 and a seat back 86 is coupled to the pivot assembly 50. Because the rear seat back 86 is connected to the pivot assembly 50, the seat back moves therewith during folding of the tricycle 10. As further shown in FIG. 1, an optional infant restraint assembly 90 is removably coupled to the seat base 82 and/or the seat back 86. The restraint assembly 90 may include one or more of a restraining hoop 94, preferably removably coupled to the seat base 82, a head rest 98, preferably removably coupled to the seat back 86, and a safety harness 102, preferably having one end coupled to the restraining hoop 94 and an opposite end coupled to the head rest 98. The safety harness 102 includes buckles for securing the safety harness 102 about a child. The tricycle 10 also includes a canopy assembly 110 that is removably coupled to the seat back 86. The canopy assembly 110 is pivotable and extendable to a variety of positions to shield a child seated on the tricycle 10 from the sun.

A foldable footrest 114 is provided and is preferably pivotably coupled to the rearward portion 34 of the frame 14. The foldable footrest 114 is shown in the use position in FIG. 1. When the tricycle 10 is folded, the first and second legs 38, 42 contact the footrest 114 and the footrest 114 folds generally forwardly in the folded or storage position. When the tricycle 10 is unfolded, gravity generally returns the footrest 114 to its unfolded or use position. A latch or detent may be provided to secure the footrest 114 in the unfolded position and prevent it from undesirably returning to the use position. Finally, the footrest 114 is removable for when the child is able to pedal the tricycle 10 on his or her own.

As shown in FIGS. 1 and 7, the front wheel 18 is rotatably supported by or rotatably connected to a front fork 118 that in turn is rotatably coupled to the forward portion 22 of the frame 14 to enable steering of the tricycle 10. Put another way, the rotatable fork 118 is adjacent the first end 22 of the frame 14. A clutch mechanism (not shown) may be provided with the front wheel 18 so the tricycle 10 can be pushed forwardly, and the front wheel 18 can rotate, even though a child positioned on the tricycle 10 may have their feet positioned on the pedals 120 and may be preventing the pedals 120 from moving. A handlebar assembly 122 is coupled to the front fork 118 such that turning of the handlebar assembly 122 turns the front wheel 18. As best shown in FIGS. 3, 4 and 7, the handlebar assembly 122 includes a release collar 126 that is releasably coupled to the forward portion 22 of the frame 14. The release collar 126 operates to secure the handle bar assembly 122 to the frame 14. When the release collar 126 is released from the forward portion 22, for example by twisting or rotating the release collar 126, the release collar 126 can be slid upwardly to expose a pivot point 130 provided in the handlebar assembly 122. With the release collar 126 slid upwardly the handlebar assembly 122 is free to pivot, for example, generally rearwardly, about pivot point 130. This allows for further foldability of the tricycle for storage and/or transportation. In one embodiment, when the restraining hoop 94 is in place, the release collar 126 is sized and configured to snap-fit within an opening 134 provided on the restraining hoop 94, thereby securing the handlebar assembly 122 in a folded configuration. While the foldable handlebar assembly 122 helps reduce the overall size of the tricycle 10 when in the folded configuration, the tricycle 10 may also be provided with a non-folding handlebar assembly.

In one embodiment, as explained above, the foldable tricycle 10 also includes a push handle or parent-steer handle 138. The parent steer handle 138 is rotatably supported by the pivot assembly 50 and is operably connected to the front fork 118 such that rotation of the parent-steer handle 138 about its axis rotates the front fork 118 to steer the tricycle 10. In this manner, the parent steer handle 138 can be used by a parent to steer the tricycle 10, especially in the stroller mode for use with a young child. In one embodiment, the parent steer handle 138 is connected to the tricycle 10 during folding of the tricycle 10, however, in an alternate embodiment the parent steer handle 138 can be removed from the tricycle 10 for use and/or folding. As shown in FIGS. 1-4, when the parent-steer handle 138 is connected to the pivot assembly 50, the handle 138 rotates with the pivot assembly 50 to the folded configuration. The push handle is similar to the steer handle, except that it may not operate to steer the tricycle.

In another embodiment, the parent steer handle 138 can be made adjustable, for example by providing an upper shaft 142, a lower shaft 146, and a coupling assembly 150 between the upper and lower shafts 142, 146. In the illustrated configuration, handle 138 is moveable between an extended position (see FIG. 1) and a retracted position (see FIGS. 2 and 4). To adjust the handle 138, the coupling assembly 150 may be rotatable between locked and unlocked configurations that selectively prevent or permit relative movement between the upper and lower shafts 142, 146 to adjust the handle 138 between the extended and retracted positions. For example, when the coupling assembly 150 is unlocked, the upper shaft 142 may be slid downwardly over the lower shaft 146 thereby shortening the overall length of the handle 138. Finally, the handle 138 may be removable from the pivot assembly 50 to allow the child to operate the tricycle 10 without parental guidance or assistance. In a preferred embodiment, in the extended position the parent-steer-handle 138, which is removably coupled to the tricycle 10, extends upwardly and away from the rear wheels 26, 30 of the tricycle 10 in the use position a distance greater than a height of the seat.

In the illustrated configurations, when the length of the parent steer handle 138 is shortened, the lower shaft 146 may extend into a space defined between a hand grip portion 151 configured for manipulation by the parent. The illustrated hand grip portion 151 forms a closed loop, however other configurations including T-shaped or V-shaped hand grip portions 150 may also be utilized.

A bag (not shown) or other storage device may be secured to and extend within the space surrounded by the hand grip portion 151. The bag may include a sleeve, a tube, or similar structure that receives the end of the lower shaft 146 when the handle 138 is in the retracted position, and in this configuration the portion of the lower shaft 146 that extends between the grip portion 151 of the handle 138 would be retained within the bag and would not be visible.

Figure 8:
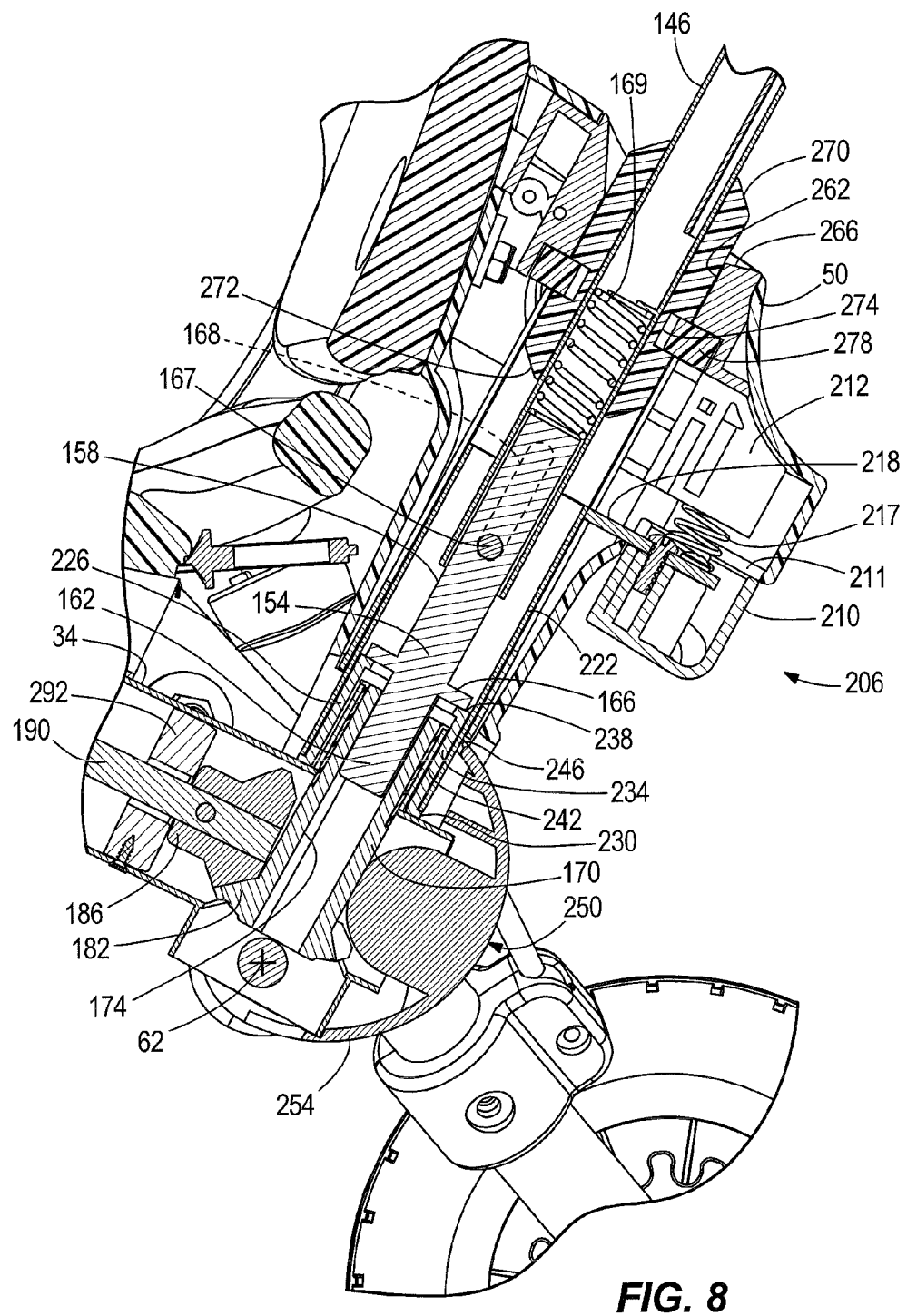
FIG. 8 is an enlargement of a portion of FIG. 7 showing a rear steer assembly, release mechanism, and pivot assembly.

Referring also to FIGS. 7 through 9, the lower shaft 146 of the parent-steer handle 138 can be seen extending into the pivot assembly 50 for engagement with a rear steer assembly 152. In one embodiment, an alignment pin or steering pin 154 is slidably received within the end of the lower shaft 146 of the handle 138. The steering pin 154 includes an upper end 158 that fits within the lower shaft 146, a drive end 162 opposite the upper end 158, and a flange portion 166 between the upper end 158 and the drive end 162. The steering pin 154 is slidingly and non-rotatably coupled to the lower shaft 146 by a pin 167 that extends through the upper end 158 and that is received by elongated slots 168 formed in the lower shaft 146. A spring 169 positioned within the lower shaft 146 engages the upper end 158 of the steering pin 154 and urges the steering pin 154 outwardly from the lower shaft 146. The pin 167 and the slots 168 cooperate to retain the steering pin 154 within the lower shaft 146 when the parent-steer handle 138 is removed from the pivot assembly 50.

As shown in FIGS. 8 and 9, when the parent steer handle 138 is coupled to the pivot assembly 50, the drive end 162 of the steering pin 154 is drivingly coupled with the rear steer assembly 152. More specifically, the drive end 162 of the steering pin 154 fits in a drive input 170 within the rearward portion 34 of the frame 14. The drive input 170 includes a drive opening 174 that is shaped to receive the drive end 162 of the steering pin 154 for non-rotatable coupling therewith. The drive end 162 is biased into engagement with the drive opening 174 by the spring 169. In one embodiment, the drive opening 174 and the drive end 162 each include a pair of substantially parallel flats joined by rounded side portions to non-rotatably couple the steering pin 154 with the drive input 170. In other embodiments, multiple pins engaging multiple bores, other non-circular cross sections such as squares, hexagons, and the like, splines, and similar configurations may also or alternatively be used to non-rotatably couple the steering pin 154 and the drive input 170 such that rotation of the handle 138 rotates drive input 170.

Figure 10:
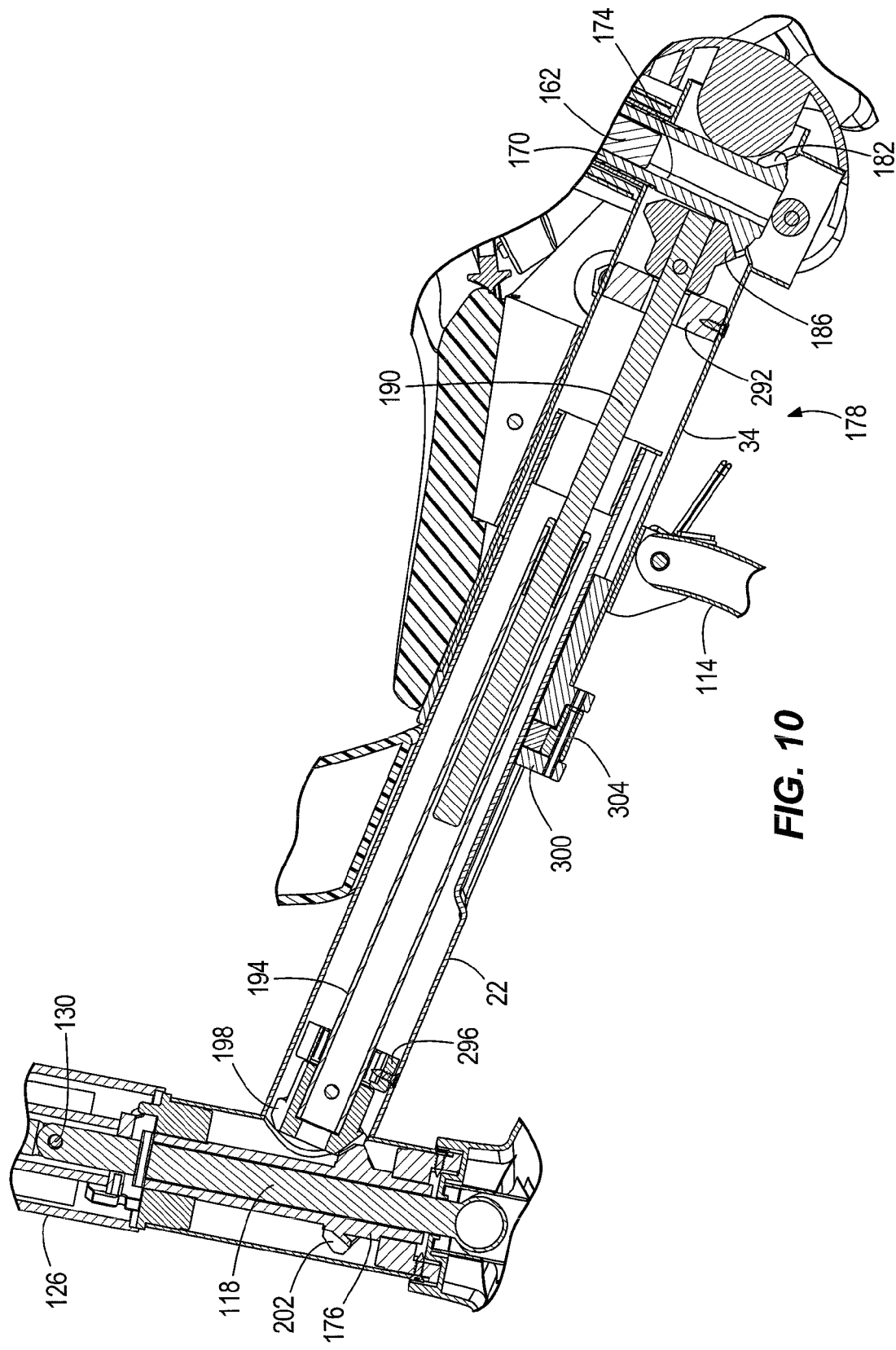
FIG. 10 is an enlargement of a portion of FIG. 7 showing a rear steer drive mechanism

Referring also to FIG. 10, although other configurations may be used, in one embodiment the rear steer assembly 152 includes the drive input 170, a drive output 176 coupled to the front fork 118, and a transmission assembly 178 extending between the drive input 170 and the drive output 176. In the illustrated configuration, the transmission assembly 178 includes a first set of bevel gears including a first gear 182 associated with the drive input 170 and rotatable therewith, and a second gear 186 in driving engagement with the first gear 182. The second gear 186 is provided on one end of a drive input shaft 190 that is slidingly and non-rotatably coupled with a drive output shaft 194.

In the illustrated configuration, the drive input shaft 190 is telescopingly received within the drive output shaft 194, and both the drive input shaft 190 and drive output shaft 194 are configured such that rotation of the drive input shaft 190 rotates the drive output shaft 194. By way of example only, in the illustrated configuration both the drive input shaft 190 and the drive output shaft 194 have square cross sections. The drive input shaft 190 and the drive output shaft 194 extend through the forward portion 22 and the rearward portion 34 of the frame 14. The sliding engagement between the drive input shaft 190 and the drive output shaft 194 allows the transmission assembly 178 to change length when the forward portion 22 and the rearward portion 34 are adjusted to change the length of the tricycle 10.

An end of the drive output shaft 194 includes a third bevel gear 198 drivingly engaged with a fourth bevel gear 202. The third and fourth bevel gear 198, 202 are each rotatably supported within the forward portion 22 and cooperate to define a second set of bevel gears. In the illustrated embodiment, the fourth bevel gear 202 is provided on the drive output 176 and the drive output 176 is drivingly coupled to the front fork 118 such that rotation of the drive output 176 rotates the front fork 118, the handlebar assembly 122, and the front wheel 18. While the illustrated embodiment of the rear steer assembly 152 uses an arrangement of bevel gears and drive shafts, alternative configurations may also or alternatively be used, such as chain and/or belt drives, different types of gearing arrangements, lever arms with pushrods, and the like.

To summarize, in the illustrated configuration, rear steering of the tricycle 10 (i.e., steering of the front wheel 18 via the parent steer handle 138) is accomplished by manipulation of the hand grip portion 151 which rotates the upper and lower shafts 142, 146 of the parent steer handle 138. As shown in FIGS. 8 and 9, rotation of the lower shaft 146 rotates the steering pin 154 by way of the pin 167 and slots 168 in the lower shaft 146. Rotation of the steering pin 154 causes rotation of the drive input 170 through engagement of the drive end 162 with the drive opening 174. Rotation of the drive input 170 rotates the first set of bevel gears 182, 186, the drive input shaft 190, the drive output shaft 194, and the second set of bevel gears 198, 202. Rotation of the second set of bevel gears 198, 202 rotates the drive output 176, which in turn rotates the front fork 118, the handlebar assembly 122, and the front wheel 18. Although a one-way coupling device could be incorporated if desired, in the illustrated configuration, the rear-steer assembly 152 can be "back driven" whereby rotation of the handlebar assembly 122 causes corresponding rotation of the hand grip portion 151.

Figure 11:
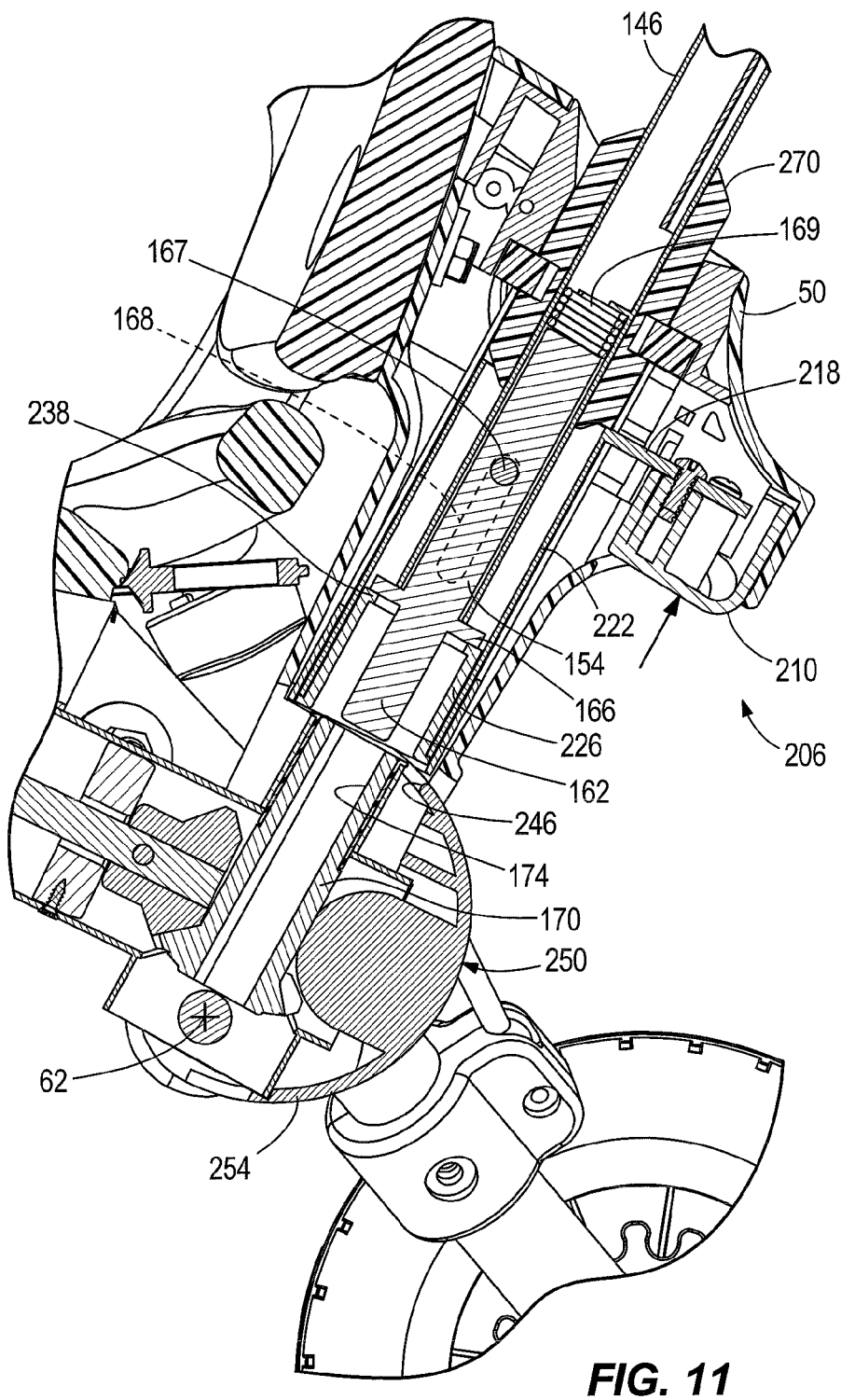
FIG. 11 is an enlargement of a portion of FIG. 7, similar to FIG. 8, and showing a steering pin in a released position.
Figure 12:
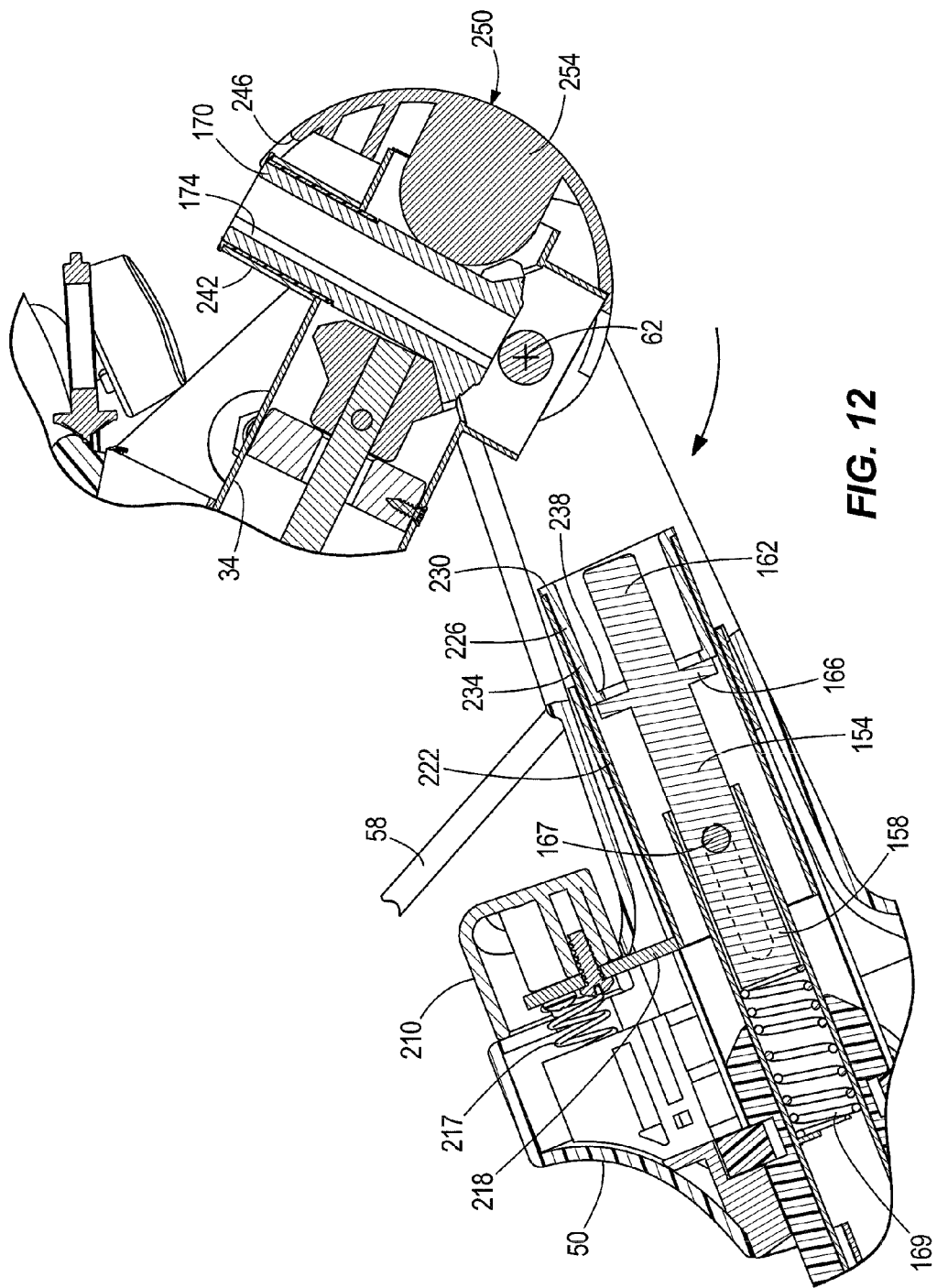
FIG. 12 is an enlargement of a portion of FIG. 7, similar to FIGS. 8 and 11, and showing the release mechanism and housing assembly rotated to the folded configuration.
Figure 13:
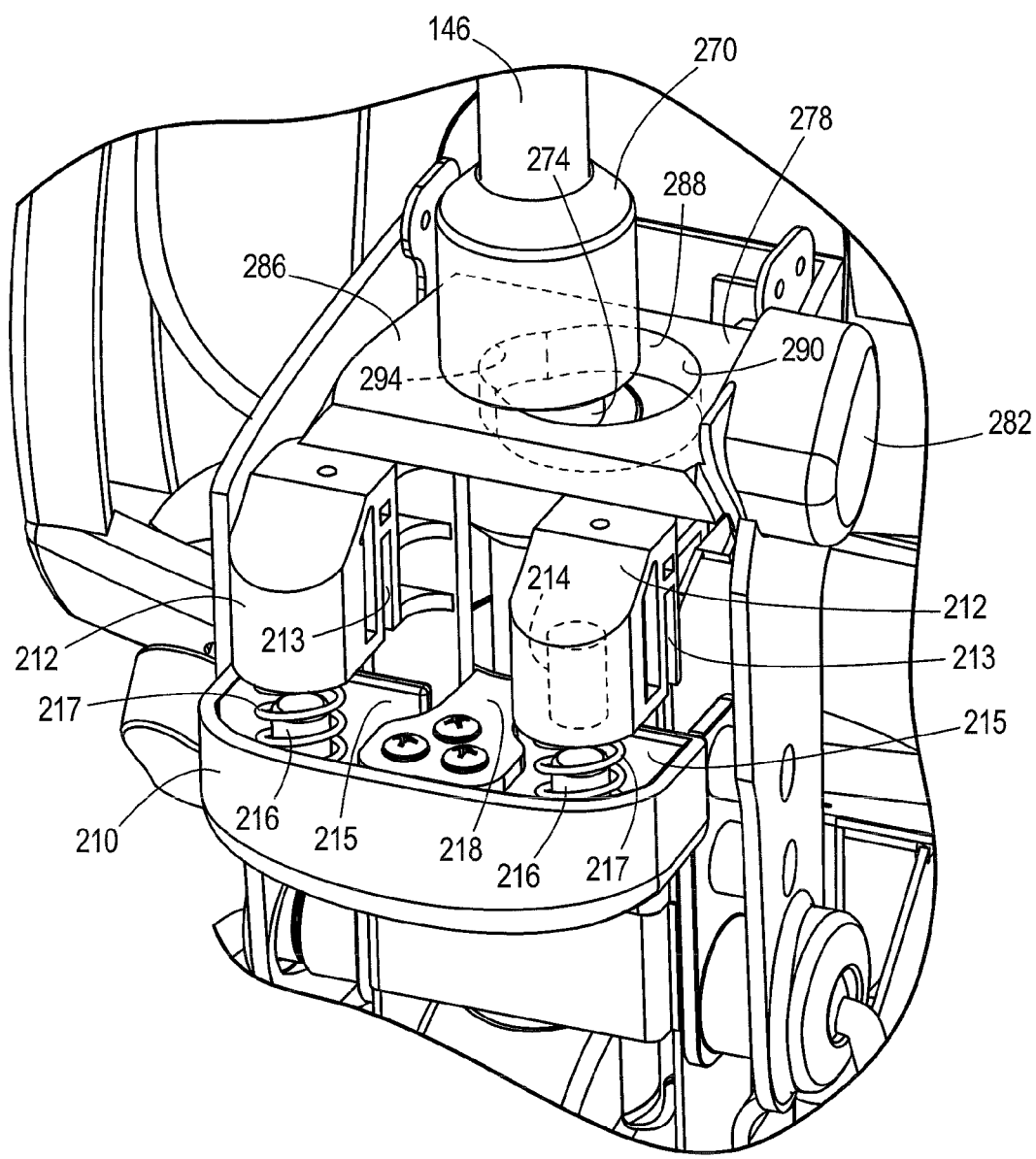
FIG. 13 is a perspective view of an enlargement of a portion of a handle attachment area of the foldable tricycle of FIG. 1, with an outer housing removed.

Referring also to FIGS. 11 through 13, to fold the tricycle 10 with the parent steer handle 138 attached to the tricycle 10, in the illustrated embodiment, the steering pin 154 is disengaged from the drive input 170. By disengaging the steering pin 154 the pivot assembly 50 is generally freed for rotation about the first axis 62. To accomplish such disengagement in this example, the pivot assembly 50 includes a release mechanism 206 for withdrawing the steering pin 154 from the drive input 170 against the biasing force provided by the spring 169. Although a variety of configurations are possible, in the illustrated embodiment, the release mechanism 206 includes a release handle 210 that extends through an opening 211 provided in a rear portion of the pivot assembly 50. The illustrated release handle 210 is linearly moveable with respect to the pivot assembly 50 in a direction substantially parallel to the longitudinal axis of the parent steer handle 138. It should be appreciated however that alternate configurations in which the release handle 210 moves in other directions, including, for example, a push button, and/or where the release handle 210 also or alternatively rotates or pivots may also be incorporated. Still other configurations may include a separate release handle latch that, unless activated, prevents substantial movement of the release handle 210 to operate the release mechanism 206. The optional release handle latch may provide a "two-step" activation of the release mechanism 206 to reduce the likelihood of accidentally operating the release mechanism 206 and also to reduce the likelihood that a child would be able to operate the release mechanism 206.

As shown in FIG. 13, in this embodiment the pivot assembly 50 includes a pair of guide members 212 that structurally support and guide movement of the release handle 210 and other components of the release mechanism 206. Although many configurations are possible, in the illustrated embodiment, each guide member 212 includes an arrangement of grooves 213 and cylindrical openings 214 that receive complimentary tabs 215 and pins 216 provided on the release handle 210. The release handle 210 may be biased in an engaging direction (e.g., generally downwardly in the Figures) by springs 217 provided, for example, in an annular space between the cylindrical openings 214 of the guide members 212 and the pins 216 of the release handle 210.

As shown in FIGS. 8, 9, 11, and 12, in one embodiment, the release handle 210 is connected to a lift bracket 218, which is coupled to a pull tube 222. The pull tube 222 surrounds the lower end of the lower shaft 146 and the lower portion of the steering pin 154 (when the parent steer handle 138 is connected to the tricycle 10). When the tricycle 10 is unfolded or in a use position (FIGS. 7 and 8) and the parent-steer handle 138 is connected to the pivot assembly 50, the pull tube 222 is substantially coaxial with the lower shaft 146 and the steering pin 154. By moving or operating the release handle 210, the pull tube 222 is simultaneously moved in a generally linear direction, and is at least partially guided during such movement by the guide members 212.

As shown in FIGS. 8, 9, 11, and 12, a lower end of the pull tube 222 receives a bushing 226 including a flange portion 230 that engages an end of the pull tube 222 and an insert portion 234 that extends into the pull tube 222. The insert portion 234 may include an internal shoulder or flange 238.

The bushing 226 is preferably press fit, welded, fastened, or otherwise non-removably coupled to the pull tube 222 for movement therewith in response to movement of the release handle 210. The internal shoulder or flange 238 is sized and configured for engagement with the flange portion 166 of the steering pin 154. The insert portion 234 of the bushing 226 is sized and configured to fit over a sleeve member 242 of the rearward portion 34 of the frame 14, which rotatably supports the drive input 170.

When the tricycle 10 is in the use or unfolded configuration and the parent steer handle 138 is received by the pivot assembly 50, the steering pin 154 is engaged with the drive input 170, and the steering pin 154, the pull tube 222, and the drive input 170 are substantially axially aligned with one another. The steering pin 154 and the drive input 170 are rotatable together due to engagement between the drive opening 174 and the drive end 162, and are rotatable with respect to the pull tube 222. The springs 169, 217 cooperate to bias the steering pin 154 and the pull tube 222 generally downwardly and into engagement with the drive input 170 and the sleeve member 242 of the rearward portion 34 of the frame 14. Similarly, if the parent steer handle 38 is removed from the tricycle 10, the springs 217 of the release handle 210 still operate to bias the pull tube 222 generally downwardly and into engagement with the drive input 170 and the sleeve member 242 of the rearward portion 34 of the frame 14, which functions to at least partially maintain the tricycle 10 in the use or unfolded configuration until the release mechanism 206 is operated.

As shown in FIGS. 8 and 11, in the example shown, to operate the release mechanism 206, a user moves the release handle 210 in the direction of the arrow in FIG. 11 to move the release handle 210 generally upwardly. The lift bracket 218 and the pull tube 222 move with the release handle 210, and engagement between the internal shoulder or flange 238 of the bushing 226 and the flange portion 166 of the steering pin 154 causes the steering pin 154 to move generally upwardly with the pull tube 222. Upward movement of the pull tube 222 and the steering pin 154 disengages the steering pin 154 from the drive input 170 and also disengages the bushing 226 from the sleeve member 242 of the rearward portion 34 of the frame 14. As shown in FIG. 11, with the steering pin 154 and the bushing 226 respectively disengaged from the drive input 170 and the cylindrical portion 242, the pivot assembly 50 and the parent-steer handle 138 are free to pivot about the first axis 62 in a folding direction (e.g., clockwise in FIGS. 7, 8, 11 and 12). In this regard, operation of the release mechanism 206 disengages the parent steer handle 138 from the rear steer assembly 152 while also freeing the pivot assembly 50 for pivotal movement about the first axis 62. Again, if the parent steer handle 38 is removed from the tricycle 10, operation of the release mechanism 206 through movement of the release handle 210 operates to disengage the pivot assembly 50 for pivotal movement about the first axis.

Referring to FIGS. 11 and 12, when the release handle 210 is sufficiently retracted, the flange portion 230 of the bushing 226 and the steering pin 154 are both positioned to clear an upper edge 246 of a guide surface 250 provided on an end cap 254 of the frame 14. The end cap 254 is coupled to and generally surrounds a rearward end of the rearward portion 34 of the frame 14. As the pivot assembly 50 is pivoted rearwardly about the first axis 62 in the folding direction, the release handle 210 can be released and the pull tube 222 and the steering pin 154 will initially be held in a retracted position due to engagement between the guide surface 250 and the flange portion 230 of the bushing 226. As the pivot assembly 50 is further rotated to the fully folded position, the cam profile of the guide surface 250 with respect to the first axis 62 gradually allows the pull tube 222 and the steering pin 154 to extend relative to the lower shaft 146 until the pull tube 222 and the steering pin 154 reach a fully extended position and thereafter the flange portion 230 of the bushing 226 completely disengages from the guide surface 250, as shown in FIG. 12.

As discussed above, pivotal movement of the pivot assembly 50 about the first axis 62 causes the first and second legs 38, 42 to fold generally forwardly (i.e., toward the front wheel) and inwardly (i.e., toward the frame 14). In one embodiment a portion of the seat, more specifically the seat back 86, is coupled to the pivot assembly 50 and also pivots about the first axis 62. As the first and second legs 38, 42 move forwardly and inwardly, they contact the footrest 114 (if installed) and cause the footrest 114 to also fold forwardly against the forward portion 22 of the frame 14 (see FIGS. 3 and 4).

The coupling assembly 150 of the parent steer handle 138 may be operated before or after folding of the tricycle 10 to reduce the overall length of the parent steer handle 138. Alternately, the handle 138 may be left in its fully extended length, if desired. When the tricycle 10 is folded, an opening 258 in the seat base 82 (see FIGS. 1-4) may be used to carry the folded tricycle 10.

To unfold the tricycle 10, the pivot assembly 50 and the handle 138 (if attached to the pivot assembly 50) are pivoted about the first axis 62 in an unfolding direction (e.g. counter-clockwise in FIGS. 7, 8, 11 and 12). Pivoting of the pivot assembly 50 in the unfolding direction moves the first and second legs 38, 42 rearwardly and outwardly toward the unfolded or use position. As the pivot assembly 50 approaches the unfolded/use position shown in FIGS. 8 and 11, the flange portion 230 of the bushing 226 engages the guide surface 250 and further rotation pushes the pull tube 222 and the steering pin 154 inwardly with respect to the lower shaft 146. Eventually the flange portion 230 passes over the upper edge 246 of the guide surface 250, at which point the springs 217 urge the bushing 226 and the pull tube 222 downwardly and into engagement with the sleeve member 242 of the rearward portion 34 of the frame 14, thereby at least partially securing the tricycle in the use or unfolded configuration.

Depending on the relative rotational position of the handlebar assembly 122 and the parent steer handle 138 when the pivot assembly 50 returns to the unfolded position, the steering pin 154 may or may not be aligned for engagement with the drive input 170. If the steering pin 154 is not aligned for engagement with the drive input 170, the parent steer handle 138 can be rotated to a rotational position substantially corresponding to the rotational position of the handlebar assembly 122, which will align the drive end 162 of the steering pin 154 with the drive opening 174 in the drive input 170 thereby allowing the spring 169 to bias the steering pin 154 into engagement with the drive input 170.

As identified above, and with reference to FIGS. 9 and 13, the parent steer handle 138 is removably coupled to the pivot assembly 50. The pivot assembly 50 includes an opening 262 in an upper portion thereof that may be surrounded by a generally concave or otherwise inwardly extending guide surface 266 for guiding the handle 138 into the opening 262. The handle 138 includes a collar 270 fixedly coupled to the lower shaft 146. The collar 270 includes an outer diameter that is sized to fit within the opening 262, and a generally frusto-conical or chamfered lead in surface 272 on an end of the collar 270 that faces the steering pin 154. The collar 270 also includes a circumferentially extending groove 274 extending around a middle portion thereof and spaced from the lead in surface 272. The circumferential groove 274 provides an area having a reduced diameter relative to the outer diameter of the collar 270.

The pivot assembly 50 includes a handle release latch 278 configured to engage the collar 270 to releasably secure the parent steer handle 138 to the pivot assembly 50 while also allowing rotation of the parent steer handle 138 with respect to the pivot assembly 50 for steering of the tricycle 10. The release latch 278 includes an actuation portion 282 that extends outwardly from the housing for actuation by the user, and a latching portion 286 positioned within the housing and engageable with the groove 274 provided on the collar 270. More specifically, in one embodiment the latching portion 286 defines a latch opening 288 having a first, generally circular portion 290 with an inner diameter slightly larger than the outer diameter of the collar 270, and a second, generally arcuate portion 294 with a diameter generally corresponding to the reduced diameter defined by the circumferential groove 274 in the collar 270. The circular portion 290 is positioned between the arcuate portion 294 and the actuation portion 282 of the release latch 278. A biasing member 298 (FIG. 9) biases the release latch 278 such that the actuation portion 282 is biased to extend outwardly from the pivot assembly 50 (e.g., generally to the left as shown in FIG. 9).

When the parent steer handle 138 is secured within the pivot assembly 50, the groove 274 is substantially axially aligned with the latching portion 286 of the release latch 278 and the release latch 278 is biased such that the arcuate portion 294 of the latch opening 288 is urged into the groove 274. As a result, a portion of the latching portion 286 is positioned in the groove 274 and limits axial movement of the handle 138 with respect to the pivot assembly 50 while permitting the handle 138 to rotate. In this regard, a parent can use the handle 138 to lift or carry the tricycle 10 without such lifting or carrying activating the folding mechanism 46 or disengaging rear steer assembly 152.

To remove the parent steer handle 138, the actuation portion 282 is depressed inwardly into the pivot assembly 50, thereby moving the circular portion 290 of the latch opening 288 into substantial axial alignment with the collar 270. Because the inner diameter of the circular portion 290 is slightly larger than the outer diameter of the collar 270, the handle 138 is released for axial movement and can be withdrawn from the pivot assembly 50. Removing the parent steer handle 138 from the pivot assembly 50 disengages the steering pin 154 from the drive input 170.

To reattach the parent steer handle 138 to the pivot assembly 50, the steering pin 154 and lower shaft 146 are inserted into the opening 262 in the pivot assembly 50. As the collar 270 engages the release latch 278, the lead in surface 272 engages the latch opening 288 and urges the release latch 278 in an inward direction against the biasing force provided by the biasing member 298. The circular portion 290 of the latch opening 288 eventually becomes substantially axially aligned with the collar 270, at which point the handle 138 can be further axially inserted into the pivot assembly 50 until the groove 274 in the collar 270 aligns with the latch opening 288 and the latching portion 286 is urged into engagement with the groove 274, thereby securing the handle 138 within the pivot assembly 50.

Similar to the situation discussed above with respect to moving the pivot assembly 50 from the folded to the unfolded position, when the handle 138 is reinserted into the pivot assembly 50, the steering pin 154 may or may not be aligned for engagement with the drive input 170. If the steering pin 154 is not aligned for engagement with the drive input 170, the parent steer handle 138 can be rotated to a rotational position substantially corresponding to the rotational position of the handlebar assembly 122, which will align the drive end 162 of the steering pin 154 with the drive opening 174 in the drive input 170 thereby allowing the spring 169 to bias the steering pin 154 into engagement with the drive input 170.

Referring also to FIGS. 1, 7 and 10, in one embodiment the frame 14 is adjustable to change a distance between the seat base 82 and the pedals 120. More specifically, the forward portion 22 of the frame 14 is slidingly received within the rearward portion 34 of the frame 14 to adjust a length of the frame 14. To maintain operation of the rear steer assembly 152 regardless of the selected length of the frame 14, the transmission assembly 178, which includes portions extending through the forward and rearward portions 22, 34 of the frame, is also adjustable. More specifically, the drive input shaft 190 of the transmission assembly 178 is slidingly received within the drive output shaft 194 of the transmission assembly 178. In the illustrated embodiment, the drive input shaft 190 is fixed with respect to the rearward portion 34 by a rear collar 292 that secures the second bevel gear 186 for engagement with the first bevel gear 182. Similarly, the drive output shaft 193 is fixed with respect to the forward portion 22 by a forward collar 296 that secures the third bevel gear 198 for engagement with the fourth bevel gear 202. Although other latching mechanisms may be used, in the illustrated embodiment a quick release latching mechanism 300 is coupled to the forward end of the rearward portion 22 and includes lever 304 that is pivotable to selectively secure and release the forward portion 22 and the rearward portion 34 for relative movement. When the latching mechanism 300 is released, the forward portion and the rearward portion 34 are slidable with respect to one another in a telescoping manner to adjust a length of the frame 14 and to thereby change a distance between the seat base 82 and the pedals 120, for example to accommodate a growing child.

Figure 14:
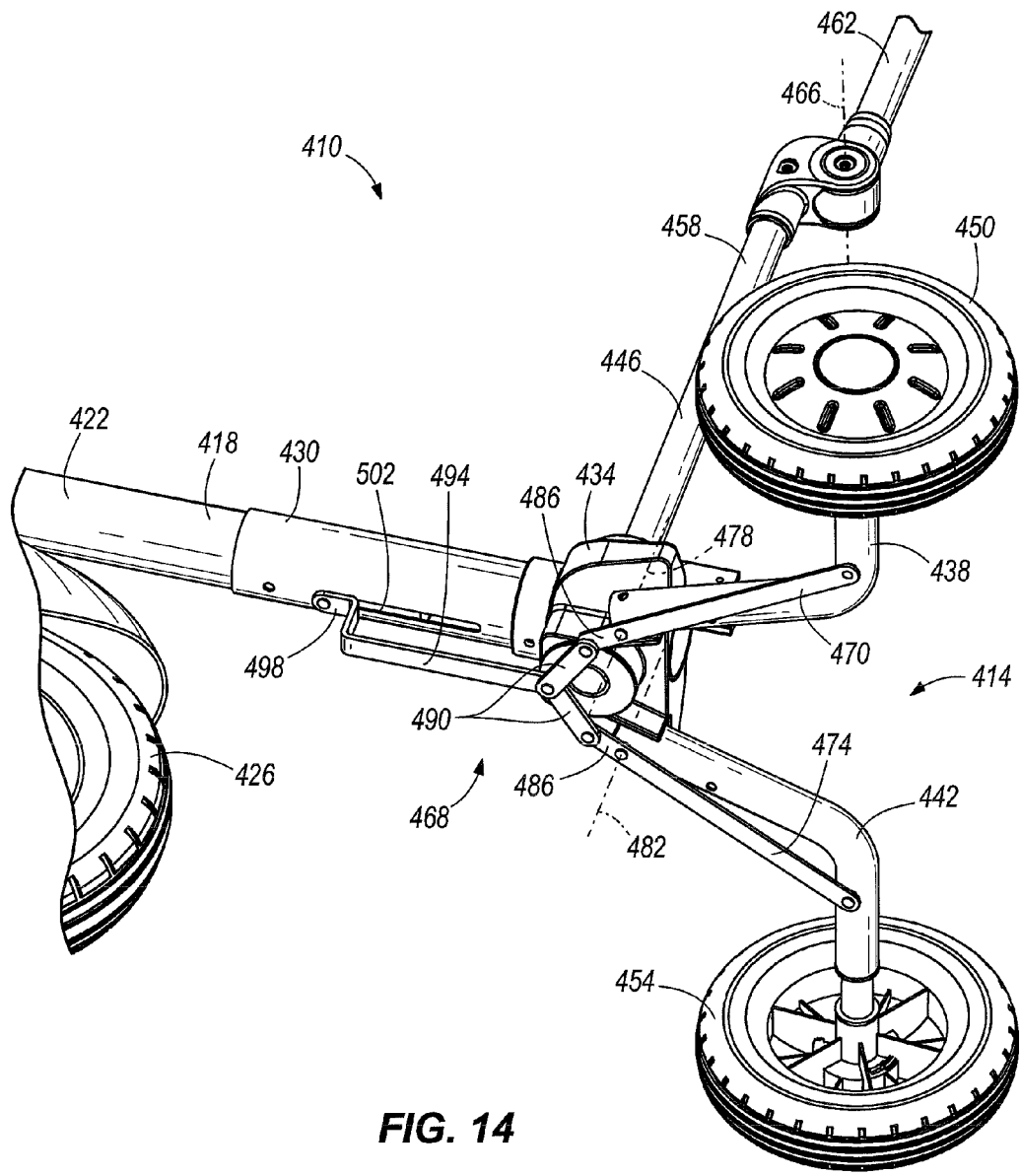
FIG. 14 is a perspective view of a portion of the underside of a foldable tricycle according to an alternative embodiment, illustrated in an unfolded configuration.
Figure 15:
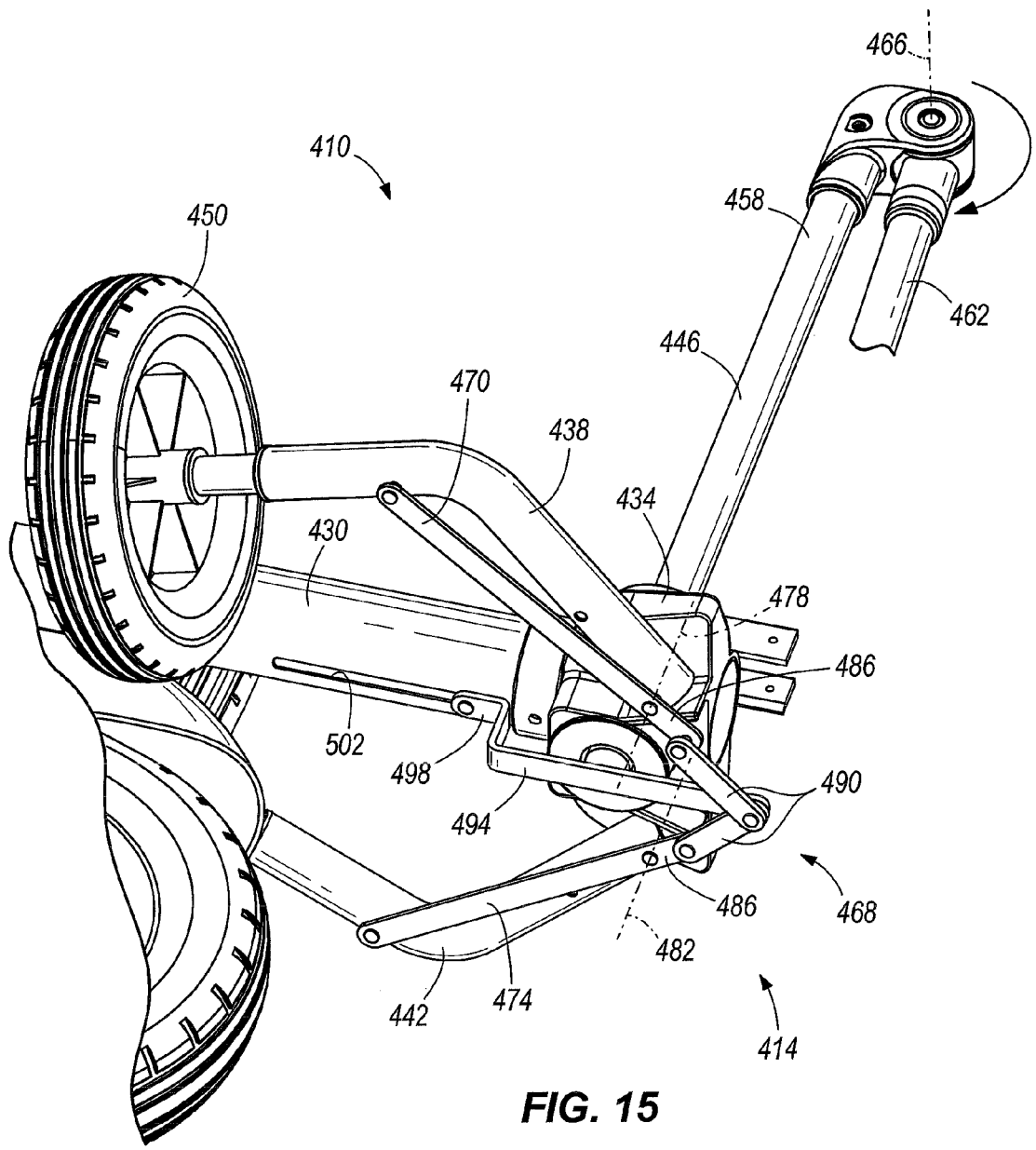
FIG. 15 is a perspective view, similar to FIG. 14, showing the alternative embodiment foldable tricycle in a folded configuration.

FIGS. 14 and 15 illustrate an alternative embodiment of a foldable tricycle 410 that includes an alternative folding assembly 414. The tricycle 410 includes a frame 418 having a forward portion 422 that supports a front wheel 426, and a rearward portion 430. The rearward portion 430 may be adjustable with respect to the forward portion 422, in a manner similar to that discussed above with respect to the embodiments of FIGS. 1-13. The rearward portion 430 is coupled to a rear junction 434 that pivotally supports first and second rear legs 438, 442, and that also pivotally supports a parent steer handle 446. Each rear leg 438, 442 rotatably supports a respective rear wheel 450, 454. The handle 446 includes a lower portion 458 pivotally coupled to the rear junction 434, and an upper portion 462 pivotally coupled to the lower portion 458 for pivotal movement about a first axis 466.

The folding assembly 414 includes a linkage arrangement 468 comprising a pair of leg links 470, 474, each leg link coupled to a respective one of the rear legs 438, 442. The rear leg 438 and its leg link 470 are coupled together for pivotal movement about a second axis 478, and the rear leg 442 and its leg link 474 are coupled together for pivotal movement about a third axis 482. The second and third axes 478, 482 are angled with respect to the first axis 466. In the unfolded configuration (FIG. 14), each leg link 470, 474 includes a coupling portion 486 that extends generally forwardly from the second and third axes 478, 482, and that is coupled to one end of a respective intermediate link 490. The opposite ends of each intermediate link 490 are both coupled to a drive link 494 that extends forwardly from the intermediate links 490 in a direction generally parallel with the longitudinal extent of the frame 418. A drive end 498 of the drive link 494 is slidingly received within a longitudinal slot 502 defined by the rearward portion 430 of the frame.

In one embodiment, a Bowden cable (not shown) or other drive assembly, such as a combination of bevel gears, drive shafts, lever arms, pushrods, and the like, operably couples the upper portion 462 of the handle 446 with the linkage arrangement 468 such that pivotal movement of the upper portion 462 of the handle 446 in a folding direction about the first axis 466 operates the linkage arrangement 468 and causes the rear legs 438, 442 to fold generally forwardly and inwardly with respect to the frame 418. More specifically, when the upper portion 462 is pivoted generally rearwardly and downwardly, as shown by the arrow in FIG. 15, the drive end 498 of the drive link 494 is moved rearwardly along the slot 502, which pivots the rear legs 438, 442 and their respective leg links 470, 474 about the second and third axes 478, 482 by way of the intermediate links 490. The rear legs 438, 442 then fold generally forwardly and inwardly, generally in a common plane, until the tricycle 410 is in the folded configuration of FIG. 15.

Depending on the specific configuration of the drive assembly, the tricycle 410 can be returned to the unfolded configuration of FIG. 14 by pivoting the upper portion 462 of the handle 446 about the first axis 466, which moves the drive end 498 of the drive link 494 forwardly in the slot 502. In other configurations, the tricycle 410 can be returned to the unfolded configuration by pivoting one of the rear legs 438, 442 generally rearwardly and outwardly, which also pivots the other of the rear legs generally rearwardly and outwardly by way of the linkage arrangement 468, and which returns the upper portion 462 of the handle 446 to the upright position shown in FIG. 14 by way of the drive assembly.

Figure 16:
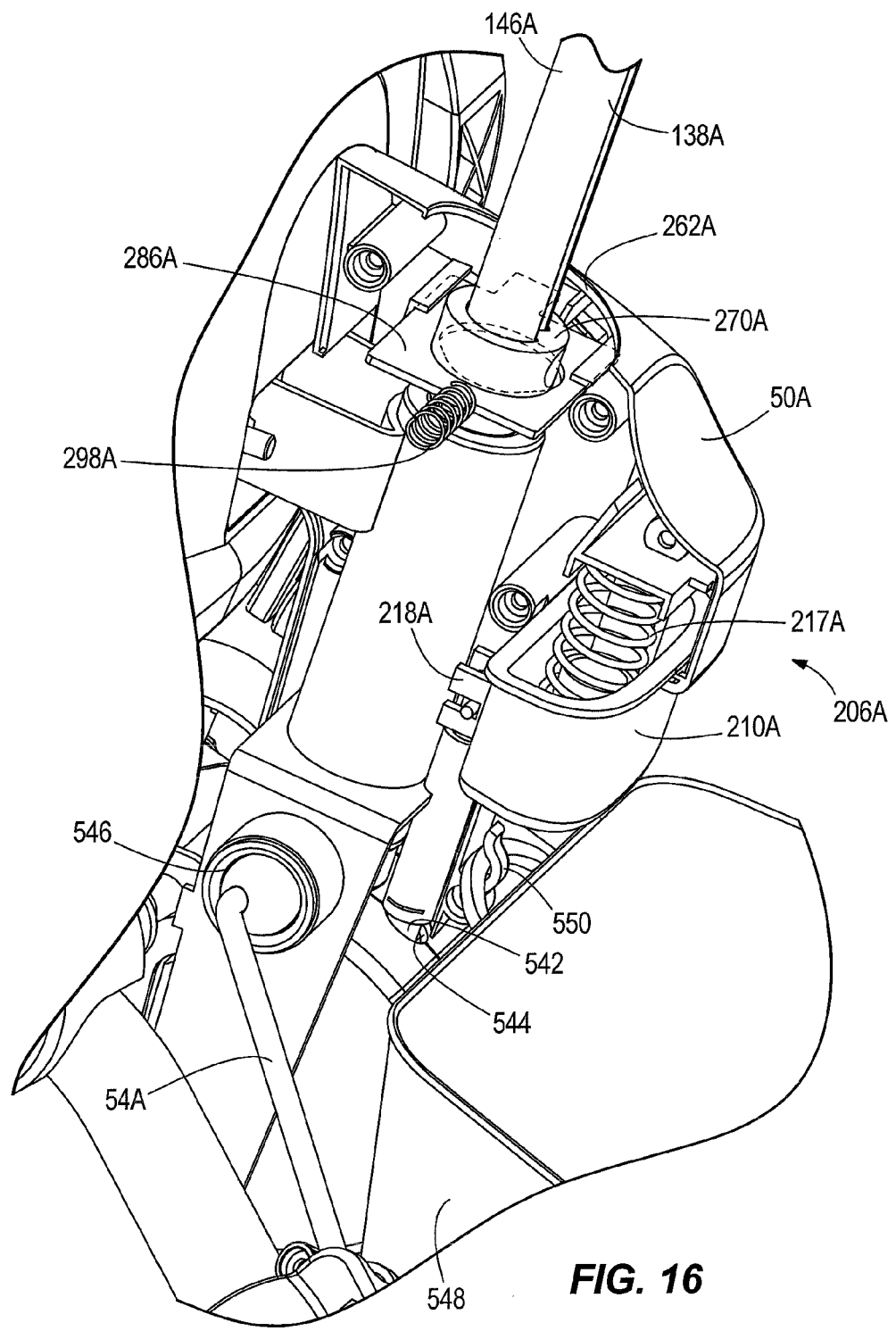
FIG. 16 is a perspective view showing further alternative embodiments of a rear steer assembly, a release mechanism, and a pivot assembly, with a portion of a housing removed.
Figure 17:
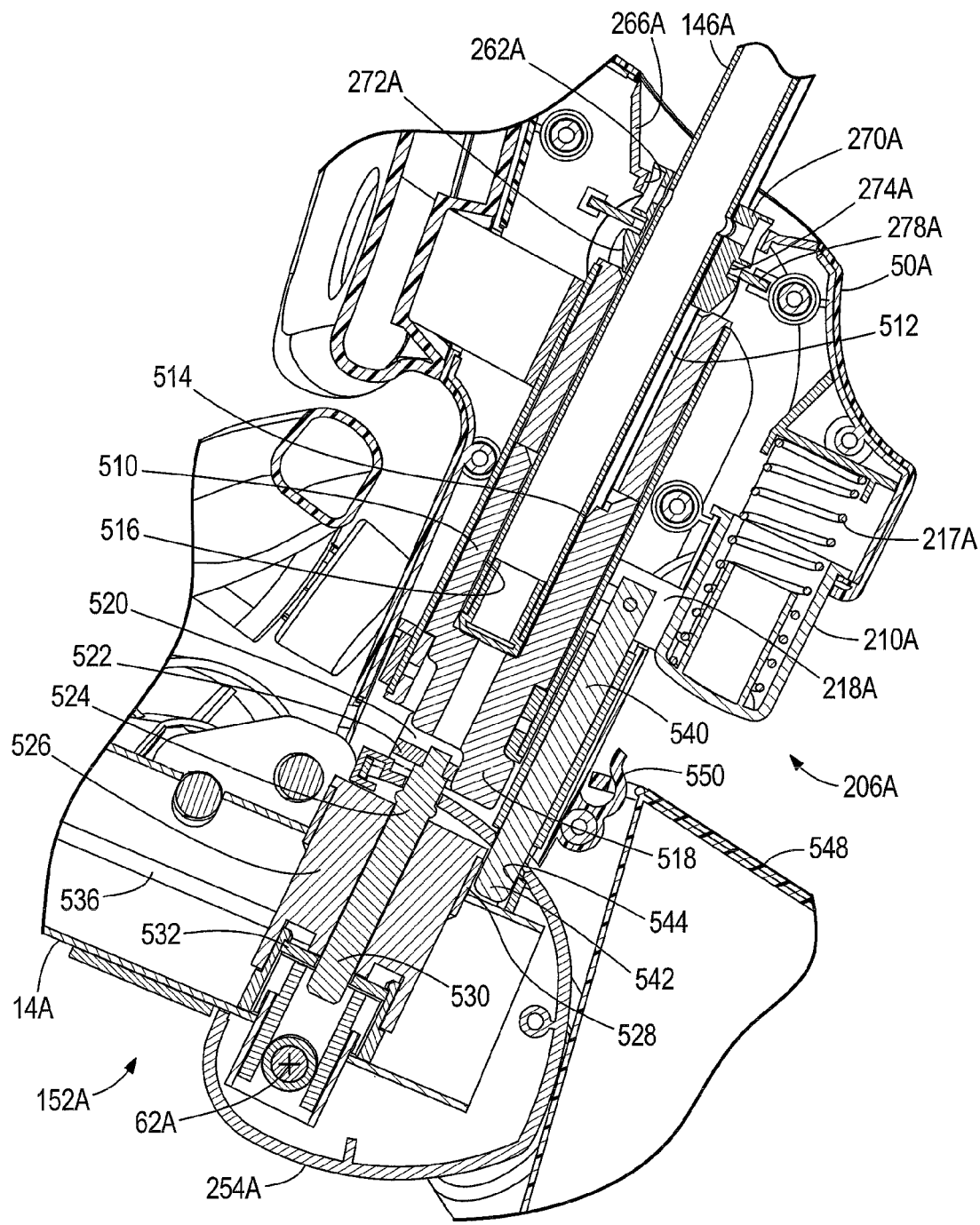
FIG. 17 is a section view, similar to FIG. 8, showing the alternative embodiments of the rear steer assembly, release mechanism, and pivot assembly of FIG. 16.
Figure 18:
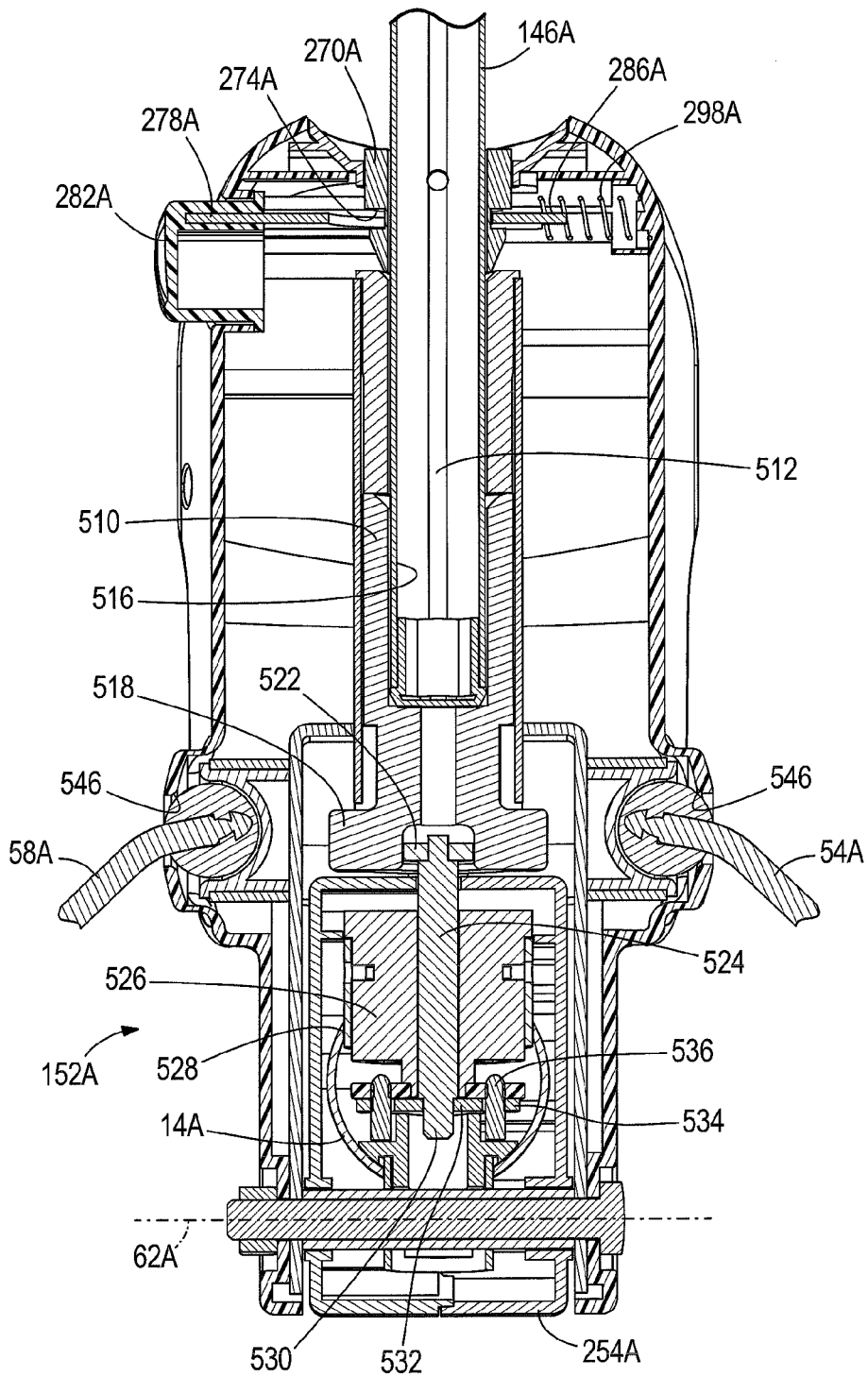
FIG. 18 is a section view, similar to FIG. 9, showing the alternative embodiments of the rear steer assembly, release mechanism, and pivot assembly of FIG. 16.

Referring also to FIGS. 16-18, alternative embodiments of the pivot assembly 50A, the rear steer assembly 152A, and the release mechanism 206A are shown. Some aspects of the alternative embodiments are similar to those discussed above with respect to FIGS. 1-13, and in this regard some parts may be provided with the same reference numeral appended with the letter "A". In the embodiment of FIGS. 16-18, parent steer handle 138A is releasably coupled to the pivot assembly 50A, which includes an opening 262A provided with a guide surface 266A for guiding entry of the lower shaft 146A of the parent steer handle 138A into the pivot assembly 50A. The handle 138A includes a collar 270A fixedly coupled to the lower shaft 146A. The collar 270A includes an outer diameter that is sized to fit within the opening 262A, and a generally frusto-conical lead in surface 272A on a distal end of the collar 270A. The collar 270A also includes a circumferentially extending groove 274A extending around a middle portion thereof and spaced from the lead in surface 272A. The circumferential groove 274A provides an area having a reduced diameter relative to the outer diameter of the collar 270A.

The folding or pivot assembly 50A includes a handle release latch 278A configured to engage the collar 270A to releasably secure the parent steer handle 138A to the pivot assembly 50A while also allowing rotation of the parent steer handle 138A with respect to the pivot assembly 50A for steering of the tricycle 10. The release latch 278A includes an actuation portion 282A (FIG. 18) that extends outwardly from the housing for actuation by the user, and a latching portion 286A positioned within the housing and engageable with the groove 274A provided on the collar 270A. In some embodiments the latching portion 286A includes a latch opening configured similarly to the latch opening 288 of the previously-described embodiments and having first and second portions of varying diameters. A biasing member 298A biases the release latch 278 such that the actuation portion 282A is biased to extend outwardly from the pivot assembly 50. When the release latch 278A is not actuated the latching portion 286A limits axial movement of the handle 138A with respect to the pivot assembly 50A while permitting the handle to rotate. When the release latch 278A is actuated, the handle 138A is released for axial movement and can be withdrawn from the pivot assembly 50A.

When the handle 138A is inserted into the pivot assembly 50A, the lower shaft 146A is non-rotatably coupled with an alignment mechanism/steering mechanism in the form of a steering sleeve 510 that is rotatably supported within the pivot assembly 50A. In the illustrated configuration, the lower shaft 146A is provided with a generally axially extending V-shaped groove 512 that receives a corresponding axially extending V-shaped projection 514 provided along an inner diameter 516 of the steering sleeve 510. Engagement of the groove 512 with the projection 514 non-rotatably couples the handle 138A and the steering sleeve 510 such that rotating the handle 138A rotates the steering sleeve 510. It should be appreciated however that other configurations may be provided for non-rotatably coupling the handle 138A and the steering sleeve 510 to one another, such as splines, flats, non-circular cross-sections, and the like. Some embodiments are configured such that there is only one relative rotational position of the handle 138A with respect to the steering sleeve 510 that permits the lower shaft 146A to be fully received within the steering sleeve 510. This configuration generally ensures that the relative rotational position of the parent steer handle 138A corresponds to the relative rotational position of the tricycle handlebars 122 when the handle 138A is inserted into the pivot assembly 50A.

Figure 19:
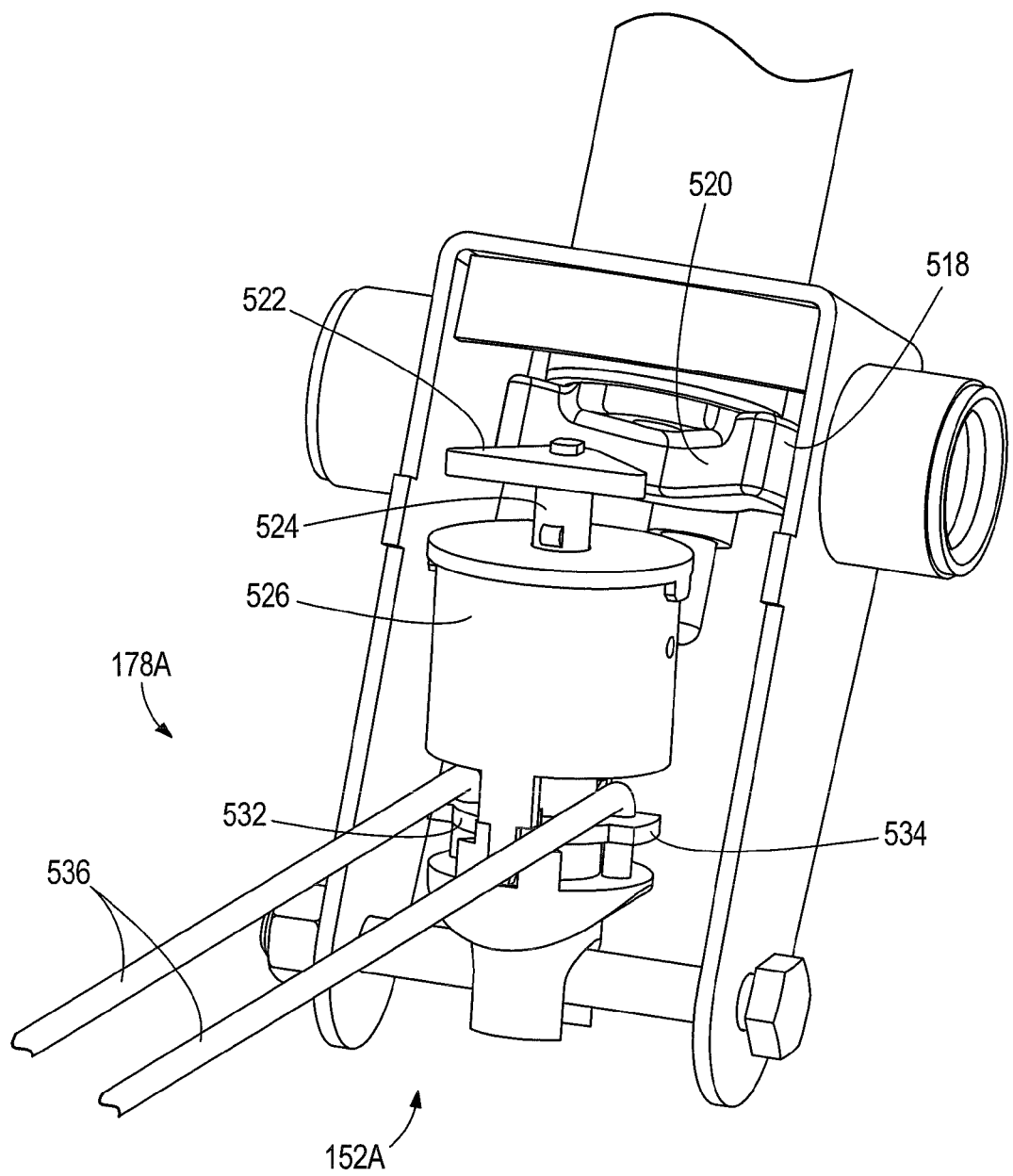
FIG. 19 is a perspective view of a portion of an alternative rear steer assembly of FIGS. 16-18 in a disengaged position, corresponding to a partially folded configuration of the tricycle.

Referring also to FIG. 19, the steering sleeve 510 includes a drive end 518 that defines a generally V-shaped recess 520. The recess 520 is configured for engagement with a drive input in the form of a generally triangular wedge member 522 provided at an upper end of a steering pin 524. The steering pin 524 is rotatably supported by a steering bushing 526 that is supported by and fits within a sleeve member 528 provided on the tricycle frame 14A. When the tricycle is in the unfolded configuration and the pivot assembly 50A is in the position shown in FIGS. 16-18, the wedge member 522 fits within the V-shaped recess 520 such that the steering sleeve 510 and the steering pin 524 are coupled for rotation together. Thus, rotation of the parent steer handle 138A causes rotation of the steering sleeve 510 by way of the engagement between the groove 512 and the projection 514, which in turn causes rotation of the steering pin 524 by way of the engagement between the V-shaped recess 520 and the wedge member 522.

Figure 20:
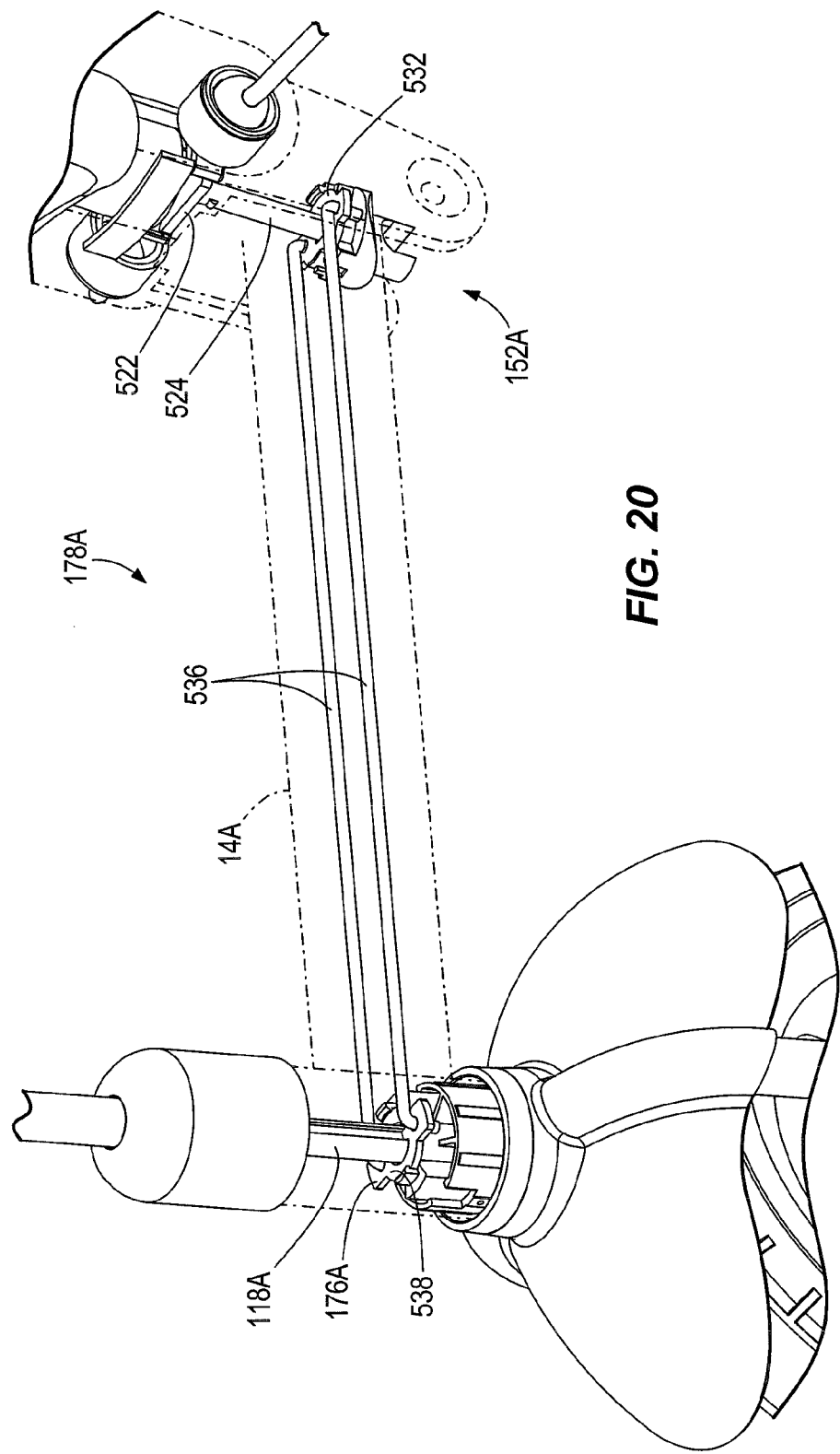
FIG. 20 is a perspective view showing an alternative embodiment of a transmission assembly with portions of the tricycle in phantom.

Referring also to FIG. 20, the exemplary rear steer assembly 152A includes the drive input, including a steering pin 524, a drive output 176A coupled to the front fork 118A, and an alternative embodiment of a transmission assembly 178A between the drive input and the drive output. In the illustrated configuration, a lower end 530 (FIG. 18) of the steering pin 524 is non-rotatably coupled to a steering plate 532. The steering plate 532 includes a pair of diametrically opposed tabs 534, and each tab 534 is configured to receive a bent end of a respective steering rod 536. The two steering rods 536 extend through the frame 14A of the tricycle 10A toward the front fork 118A and are coupled to the drive output 176A, which in the illustrated configuration is a second steering plate 538 similar to the steering plate 532. The second steering plate 538 is non-rotatably coupled to the front fork 118A such that rotation of the second steering plate 538 rotates the front fork 118A, and vice-versa. In the illustrated configuration the transmission assembly 178A includes the steering plate 532, the steering rods 536, and the second steering plate 538. In operation, the steering rods 536 act as a push-pull system for causing the steering plate 532 and second steering plate 538 to rotate such that rotation of the parent steer handle 138A or the front fork 118A causes rotation of the other of the parent steer handle 138A and the front fork 118A. It should be appreciated that the previously described transmission assembly 178 or other alternative transmission assemblies could also be used in combination with the steering pin 524, for example by non-rotatably coupling the steering pin 524 with the first gear 182.

In the configuration of FIGS. 16-20, rear steering of the tricycle is accomplished by manipulation of the parent steer handle 138A to cause rotation of the lower shaft 146A, which in turn rotates the steering sleeve 510 by way of engagement between the V-shaped groove 512 and the V-shaped projection 514. Rotation of the steering sleeve 510 causes rotation of the steering pin 524 through engagement of the V-shaped recess 520 and the wedge member 522. Rotation of the steering pin 524 rotates the steering plate 532, which pushes and pulls on the steering rods 536 to rotate the second steering plate 538. Rotation of the second steering plate 538 rotates the front fork 118A for steering of the tricycle. Although a one-way coupling device could be incorporated if desired, in the illustrated configuration, the rear-steer assembly 152A can be "back driven" whereby rotation of the fork 118A (e.g., via the handlebars) causes corresponding rotation of the parent steer handle 138A.

Figure 21:
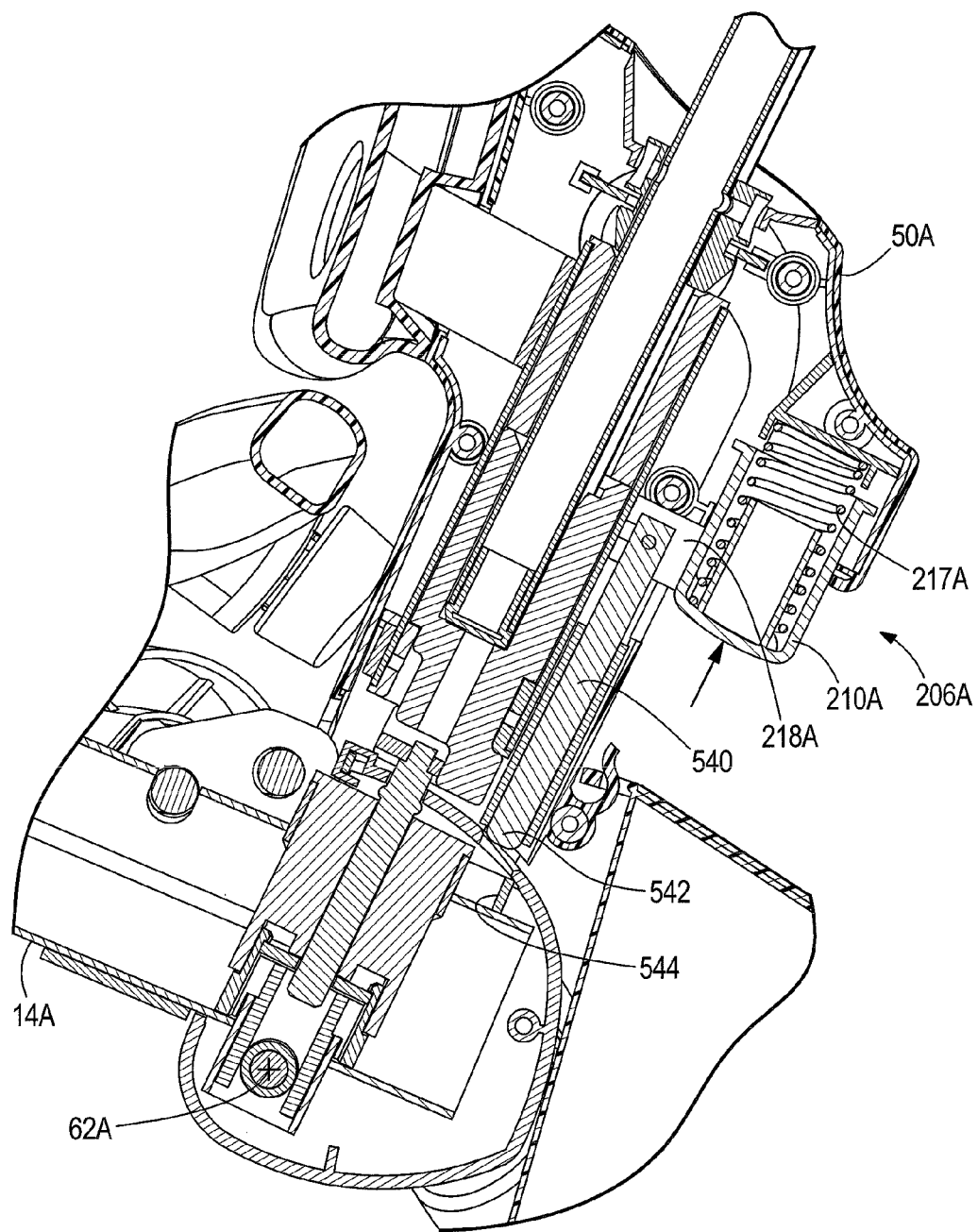
FIG. 21 is a section view of the embodiment of FIG. 16, similar to FIG. 11, and showing a latching pin in a release position.
Figure 22:
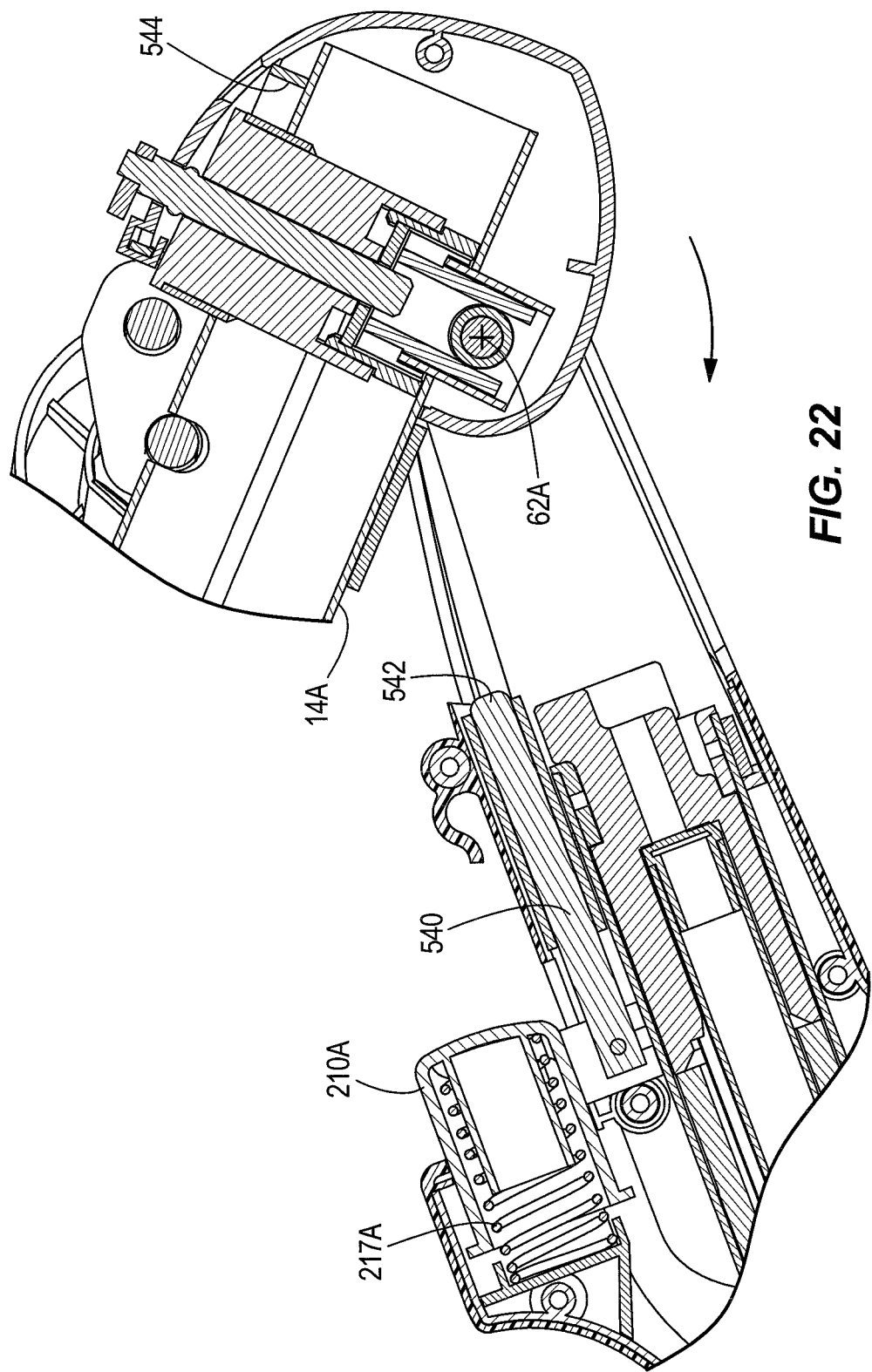
FIG. 22 is a section view of the embodiment of FIG. 16, similar to FIG. 12, and showing the release mechanism and pivot assembly rotated to the folded configuration.

Referring also to FIGS. 21 and 22, the folding or pivot assembly 50A can be rotated about the axis 62A to adjust the tricycle between the unfolded and folded configurations through operation of the alternate release mechanism 206A. In the configuration of FIGS. 16-22, rotation of the pivot assembly 50A can also engage and disengage the drive end 518 of the steering sleeve 510 and the wedge member 522 of the steering pin 524. The release mechanism 206A includes an axially moveable latching pin 540 that is coupled to a release handle 210A by way of a lift bracket 218A. The release handle 210A can be generically referred to as an actuator. The release handle 210A is supported by the pivot assembly 50A for generally axially movement and is biased toward an extended position by a release spring 217A. The release spring 217A also biases a latching end 542 of the latching pin 540 into engagement with a latching bore 544 provided in the tricycle frame 14A. In an alternate embodiment, a separate latching spring (not shown) biases the latching pin 540 into the latching bore 544. The latching spring may connected between the lift bracket 218A and the latching pin 540 to bias the lathing pin 540 into the latching bore 544. The latching spring preferably has a smaller spring force than the release spring 217A, such that when the pivot assembly 50A is rotated a lesser biasing force is provided on the latching pin 540 to preclude the latching end 542 of the latching pin 540 from marring the guide surface 250 of the assembly. When the latching end 542 is received in the latching bore 544 the pivot assembly 50A is substantially fixed in the upright position shown in FIGS. 16 and 17, which corresponds to the use or unfolded configuration of the tricycle. Additionally, the latching bore 544 shown in the Figures may be modified to be a bore in a tab extending from the rearward portion 34 of the frame 14. Further, a stop, may be provided under the bore 544 to provide a tactile and audible indication that the latching pin 540 is seated in the latching bore 544.

In the example shown, to operate the release mechanism 206A and release the folding or pivot assembly 50A for rotational movement about the axis 62A, a user moves the actuator or release handle 210A in the direction of the arrow in FIG. 21 to move the release handle 210A generally upwardly. The lift bracket 218A and the latching pin 540 move with the release handle 210A, and the latching end 542 of the latching pin 540 is withdrawn from the latching bore 544. With the latching end 542 withdrawn from the latching bore 544, the pivot assembly 50A is free to pivot generally rearwardly and downwardly (e.g., clockwise in the figures) about the axis 62A. Such rotation of the pivot assembly 50A disengages the drive end 518 of the steering sleeve 510 from the wedge member 522 of the steering pin 524 (see FIG. 19). In this regard, operation of the release mechanism 206A and pivoting of the pivot assembly 50A disengages the parent steer handle 138A from the rear steer assembly 152A. Regardless of whether the parent steer handle 138A is received by the pivot assembly 50A, operation of the release mechanism 206A through movement of the release handle 210A operates to release the pivot assembly 50A for pivotal movement about the axis 62A. With the pivot assembly 50A released for pivotal movement about the axis 62A, the pivot assembly 50A can be pivoted to the position shown in FIG. 22, which corresponds with the folded configuration of the tricycle. As shown in FIGS. 16 and 18, the pivot assembly 50A includes ball and socket type connections 546 with the first and second links 54A, 58A to affect the previously described forward and inward folding of the tricycle legs. Accordingly, when the folding assembly 50A is actuated and movement of the folding assembly 50A is conducted the folding assembly 50A and the first and second rear wheels 26, 30 will simultaneously transition from the use position to the storage position. In the storage position the first and second wheels 26, 30 are positioned adjacent the first end 22 of the frame 14 and at a second distance from the longitudinal axis of the frame 14. In a preferred embodiment the second distance from the longitudinal axis of the frame 14 is less than the first distance from the longitudinal axis of the frame 14. Accordingly, the rear wheels 26, 30 are said to move both forwardly and inwardly in transitioning from the use position to the storage position.

To return the tricycle to the use or unfolded configuration, the pivot assembly 50A is rotated back toward the position shown in FIGS. 16-18. As the latching pin 540 approaches the latching bore 544, the end cap 254A pushes the latching pin 540 toward a retracted position against the biasing force of the spring 217A or alternate latch spring as previously described. Also, as the drive end 518 of the steering sleeve 510 approaches the wedge member 522 of the steering pin 524 (see FIG. 19), the angled surfaces of the V-shaped recess 520 engage the wedge member 522. As the wedge member 522 and V-shaped recess 520 are brought into more complete engagement with one another, the mating surfaces act as guiding or cam surfaces to correct any rotational misalignment between the steering sleeve 510 and the steering pin 524 by causing rotation of one or both of the steering sleeve 510 and steering pin 524. Once the latching pin 540 has been moved into alignment with the latching bore 544, the spring 217A, or alternate latch spring as described above, biases the latching end 542 into engagement with the latching bore 544, and the pivot assembly 50A is once again secured in the position associated with the use or unfolded configuration of the tricycle, and the rear steer assembly 152A is once again engaged and operable to affect steering of the front fork 18A by way of the parent steer handle 136A.

A container 548, such as a bag or other storage device, may be secured to and extend between the first and second legs 38, 42 for storing items. For example, a soft or hard bag may be provided and may be coupled to and at least partially supported by one or both of the rearward portion 34 of the frame and the pivot assembly 50. In the illustrated configuration of FIGS. 16-18, the pivot assembly 50A is provided with a hook 550 to which a top portion of the container 548 may be secured. Other portions of the container may be secured to, for example, the first and second legs 38, 42 of the tricycle by suitable fasteners, such as hook and loop fasteners, snaps, buttons, elastic bands, and the like. The bag or storage device may be formed of a combination of fabric, foam, plastic, and/or other materials. The bag or storage device may be configured to fold or collapse so that the bag or storage device can remain attached to the tricycle 10 during folding and storage, as well as during use of the tricycle 10. By way of example only, a bottom or other portion of the bag may be formed of panels or similar discrete portions connected by a hinge (e.g. a stitch line) or other reduced cross section area. The panels and the hinges may be configured and arranged such that as the tricycle is folded the panels fold or collapse about the hinges to reduce the overall volume of the bag or storage device.

While specific embodiments have been illustrated and described, numerous modifications come to mind without significantly departing from the spirit of the disclosure, and the scope of protection is only limited by the scope of the accompanying claims.

What is claimed is:

1. A tricycle that converts from a use position to a transport or storage position, the tricycle comprising:
    a frame having a first end and a second end;
    a rotatable fork adjacent the first end of the frame;
    a front wheel rotatably connected to the fork;
    a handlebar assembly coupled to the fork to allow for steering of the fork;
    first and second rear wheels located adjacent the second end of the frame in the use position, the first and second rear wheels further being positioned a first distance from a longitudinal axis of the frame in the use position; and,
    a folding assembly pivotably coupled adjacent the second end of the frame at a first pivot location defining a first pivot axis, the first and second rear wheels coupled to the folding assembly, the folding assembly having an actuator to allow pivoting of the folding assembly to simultaneously transition the first and second rear wheels to a storage position, wherein the first and second wheels are positioned adjacent the first end of the frame and at a second distance from the longitudinal axis of the frame in the storage position, the first distance being greater than the second distance.

2. The tricycle of claim 1, wherein the first pivot axis is substantially perpendicular to a longitudinal extent of the frame.

3. The tricycle of claim 1, further comprising a steer handle removably connected to the folding assembly, the tricycle operating in a stroller mode when the steer handle is connected to the folding assembly.

4. The tricycle of claim 3, further comprising a transmission assembly coupling the steer handle and the fork, and wherein rotation of the steer handle causes rotation of the fork to steer the tricycle.

5. The tricycle of claim 1, further comprising a seat coupled to the tricycle.

6. The tricycle of claim 5, wherein a location of the seat is adjustable about a length of the frame.

7. The tricycle of claim 5, wherein the seat comprises a seat portion coupled to the frame and a back portion coupled to the folding assembly, wherein the back portion transitions from the use position to the storage position with the folding assembly.

8. The tricycle of claim 1, further comprising a removable footrest coupled to the frame, the footrest positionable in a footrest use position and a footrest storage position when coupled to the frame, wherein pivoting of the folding assembly and first and second rear wheels causes the footrest to be positioned in the footrest storage position.

9. The tricycle of claim 1, wherein the frame comprises a forward portion at the first end and a rearward portion at the second end, the forward and rearward portions of the frame members having a telescoping relationship to increase and decrease a length of the frame.

10. The tricycle of claim 1, further comprising a first leg having a distal end and a proximal end, the proximal end pivotally coupled to the frame at a second pivot location, the second pivot location defining a second pivot axis that is angled with respect to the first pivot axis, wherein the first rear wheel is pivotally coupled to the distal end of the first leg, and a second leg having a distal end and a proximal end pivotally coupled to the frame at a third pivot location, the third pivot location defining a third pivot axis that is angled with respect to the first pivot axis, and wherein the second rear wheel is pivotally coupled to the distal end of the second leg.

11. The tricycle of claim 10, further comprising a first link having a first end pivotally coupled to the folding assembly and a second end pivotally coupled to the first leg at a location between the distal end and the proximal end, and a second link having a first end pivotally coupled to the folding assembly and a second end pivotally coupled to the second leg at a location between the distal end and the proximal end.

12. The tricycle of claim 1, further comprising a collapsible storage container connected between the wheels in the use and the storage positions.

13. A tricycle that converts from a use position to a transport or storage position, the tricycle comprising:
    a frame having a first end and a second end;
    a rotatable fork adjacent the first end of the frame;
    a front wheel rotatably connected to the fork;
    a handlebar assembly coupled to the fork to allow for steering of the fork;
    a seat coupled to the frame;
    first and second rear wheels located adjacent the second end of the frame in the use position, the first and second rear wheels further being positioned a first distance from a longitudinal axis of the frame in the use position; and,
    a push handle removably coupled to the tricycle and extending upwardly and away from the rear wheels a distance greater than a height of the seat in the use position, wherein the first and second rear wheels are transitionable from the use position to the storage position, the rear wheels being located closer to the front wheel in the storage position than in the use position, and wherein the push handle remains coupled to the tricycle in the storage position.

14. The tricycle of claim 13, wherein the push handle is coupled to a folding assembly that is pivotally coupled to the second end of the frame at a first pivot axis.

15. The tricycle of claim 14, wherein the first and second rear wheels are coupled to the folding assembly, and wherein the folding assembly has an actuator to allow pivoting of the folding assembly about the first pivot axis to simultaneously transition the first and second rear wheels and the push handle to the storage position.

16. The tricycle of claim 14, wherein the push handle is removable from the folding assembly, and wherein the folding assembly can be actuated to pivot the folding assembly and the rear wheels from the use position to the storage position when the steer handle is removed from the tricycle.

17. The tricycle of claim 13, wherein the push handle is rotatably coupled to an input of a transmission assembly in the frame to operate as a parent steer handle, an output of the transmission assembly being coupled to the fork to rotate the fork with the push handle.

18. The tricycle of claim 13, wherein the push handle comprises an upper shaft and a lower shaft, the upper shaft being moveable between an extended position and a retracted position to decrease a length of the push handle.

19. A tricycle that converts from a use position to a transport or storage position, the tricycle comprising:
    a frame having a first end and a second end;
    a rotatable fork adjacent the first end of the frame;
    a front wheel rotatably connected to the fork;
    a handlebar assembly coupled to the fork to allow for steering of the fork;
    first and second rear wheels located adjacent the second end of the frame in the use position, the first and second rear wheels further being positioned a first distance from a longitudinal axis of the frame in the use position;
    a folding assembly pivotally coupled adjacent the second end of the frame at a first pivot location defining a first pivot axis;
    a first leg having a distal end and a proximal end, the proximal end pivotally coupled to the frame at a second pivot location, the second pivot location defining a second pivot axis that is angled with respect to the first pivot axis, wherein the first rear wheel is pivotally coupled to the distal end of the first leg; and,
    a second leg having a distal end and a proximal end pivotally coupled to the frame at a third pivot location, the third pivot location defining a third pivot axis that is angled with respect to the first pivot axis, and wherein the second rear wheel is pivotally coupled to the distal end of the second leg, wherein folding of the folding assembly simultaneously pivots the first and second rear wheels about the second and third pivot axes, respectively, to a storage position.

20. The tricycle of claim 19, wherein the first and second wheels are positioned adjacent the first end of the frame and at a second distance from the longitudinal axis of the frame in the storage position, the first distance being greater than the second distance.

21. The tricycle of claim 19, further comprising a first link having a first end pivotally coupled to the folding assembly and a second end pivotally coupled to the first leg at a location between the distal end and the proximal end, and a second link having a first end pivotally coupled to the folding assembly and a second end pivotally coupled to the second leg at a location between the distal end and the proximal end.

* * * * *